United States Patent
Farlow et al.

(10) Patent No.: US 7,392,015 B1
(45) Date of Patent: Jun. 24, 2008

(54) CALIBRATION METHODS AND STRUCTURES IN WIRELESS COMMUNICATIONS SYSTEMS

(75) Inventors: Charles S. Farlow, Waconia, MN (US); Donald M. Bosch, Plymouth, MN (US); Randall A. Kroenke, Shakopee, MN (US); Steven J. Loughran, Chaska, MN (US)

(73) Assignee: CalAmp Corp., Oxnard, CA (US)

( * ) Notice: Subject to any disclaimer, the term of this patent is extended or adjusted under 35 U.S.C. 154(b) by 828 days.

(21) Appl. No.: 10/753,502

(22) Filed: Jan. 7, 2004

Related U.S. Application Data

(60) Provisional application No. 60/447,791, filed on Feb. 14, 2003.

(51) Int. Cl.
*H04B 17/00* (2006.01)

(52) U.S. Cl. .................. 455/67.11; 455/67.13; 455/126; 455/562.1; 455/63.1; 455/69; 455/115.1; 455/226.1; 370/343; 370/442; 342/457; 342/387

(58) Field of Classification Search .............. 455/67.11, 455/126, 562.1, 423, 424, 575.7, 115.1, 226.1, 455/67.14, 63.1, 67.13, 69; 370/321, 329, 370/343

See application file for complete search history.

(56) References Cited

U.S. PATENT DOCUMENTS

| | | | | |
|---|---|---|---|---|
| 5,546,090 A * | 8/1996 | Roy et al. | ..................... | 342/174 |
| 5,828,658 A * | 10/1998 | Ottersten et al. | ............. | 370/310 |
| 6,037,898 A * | 3/2000 | Parish et al. | ................. | 342/174 |
| 6,088,602 A * | 7/2000 | Banister | ..................... | 455/574 |
| 6,104,935 A * | 8/2000 | Smith et al. | ............... | 455/562.1 |
| 6,124,824 A * | 9/2000 | Xu et al. | ..................... | 342/174 |
| 6,128,276 A * | 10/2000 | Agee | ......................... | 370/208 |
| 6,134,261 A * | 10/2000 | Ryan | ......................... | 375/141 |
| 6,144,711 A * | 11/2000 | Raleigh et al. | ............... | 375/347 |
| 6,281,834 B1 * | 8/2001 | Stilp | ........................... | 342/174 |
| 6,496,140 B1 * | 12/2002 | Alastalo | ..................... | 342/174 |
| 6,512,737 B1 * | 1/2003 | Agee | ......................... | 370/208 |
| 6,603,810 B1 * | 8/2003 | Bednekoff et al. | .......... | 375/228 |
| 6,615,024 B1 * | 9/2003 | Boros et al. | ............... | 455/67.14 |
| 6,654,590 B2 * | 11/2003 | Boros et al. | ............... | 455/67.14 |
| 6,668,161 B2 * | 12/2003 | Boros et al. | ............... | 455/67.14 |
| 6,735,422 B1 * | 5/2004 | Baldwin et al. | .......... | 455/232.1 |
| 6,738,020 B1 * | 5/2004 | Lindskog et al. | ............ | 342/377 |
| 6,778,612 B1 * | 8/2004 | Lozano et al. | ............... | 375/299 |
| 6,788,948 B2 * | 9/2004 | Lindskog et al. | ............ | 455/504 |
| 6,792,049 B1 * | 9/2004 | Bao et al. | .................... | 375/285 |

(Continued)

OTHER PUBLICATIONS

Lal C. Godara, "Applications of Antenna Arrays to Mobile Communications, Part I: Performance Improvement, Feasibility and System Considerations", Proceedings of the IEEE, vol. 85, No. 7, Jul. 1997.

(Continued)

*Primary Examiner*—Marceau Milord
(74) *Attorney, Agent, or Firm*—Koppel, Patrick, Heybl & Dawson

(57) ABSTRACT

Calibration methods and structures are provided for wireless communications devices that compensate across a signal bandwidth for relative gain and phase errors between spatial communication channels while utilizing existing transceiver structures and facilitating the use of frequency-domain spatial processing. The methods and structures are directed to time-division duplex (TDD) systems, and are particularly suited to those that incorporate orthogonal frequency division multiplexing (OFDM).

34 Claims, 14 Drawing Sheets

U.S. PATENT DOCUMENTS

| | | | | |
|---|---|---|---|---|
| 6,819,910 | B2 * | 11/2004 | Shi et al. | 455/126 |
| 6,856,281 | B2 * | 2/2005 | Billington et al. | 342/174 |
| 6,862,440 | B2 * | 3/2005 | Sampath | 455/276.1 |
| 6,882,831 | B2 * | 4/2005 | Shi et al. | 455/116 |
| 6,934,541 | B2 * | 8/2005 | Miyatani | 455/423 |
| 6,937,592 | B1 * | 8/2005 | Heath et al. | 370/342 |
| 6,950,398 | B2 * | 9/2005 | Guo et al. | 370/235 |
| 6,959,048 | B1 * | 10/2005 | Horneman et al. | 375/299 |
| 6,963,742 | B2 * | 11/2005 | Boros et al. | 455/424 |
| 6,980,527 | B1 * | 12/2005 | Liu et al. | 370/280 |
| 6,982,968 | B1 * | 1/2006 | Barratt et al. | 370/328 |
| 6,983,127 | B1 * | 1/2006 | Da Torre et al. | 455/67.11 |
| 7,012,978 | B2 * | 3/2006 | Talwar | 375/346 |
| 7,027,523 | B2 * | 4/2006 | Jalali et al. | 375/296 |
| 7,035,592 | B1 * | 4/2006 | Doi et al. | 455/67.14 |
| 7,039,016 | B1 * | 5/2006 | Lindskog et al. | 370/252 |
| 7,110,469 | B2 * | 9/2006 | Shi et al. | 375/295 |

OTHER PUBLICATIONS

Lal C. Godara, et al., "Limitations and Capabilities of Frequency Domain Broadband Constrained Beamforming Schemes", IEEE Transactions on Signal Processing, vol. 47, No. 9, Sep. 1999, pp. 2386-2395.

Van Veen, B. D., et al., "Beamforming: A Versatile Approach to Spatial Filtering", IEEE ASSP Magazine, Apr. 1998, pp. 4-24.

Krim, Hamid, et al., "Two Decades of Array Signal Processing Research", IEEE Signal Processing Magazine, Jul. 1996, pp. 67-94.

K. K. Wong, et al., "Adaptive Antennas at the Mobile and Base Stations in an OFDM/TDMA System", IEEE Transactions on Communications, vol. 49, No. 1 Jan. 2001, pp. 195-206.

* cited by examiner

CALIBRATION METHODS AND STRUCTURES IN WIRELESS COMMUNICATIONS SYSTEMS

CROSS REFERENCES TO RELATED APPLICATIONS

This application claims the benefit of U.S. Provisional Application Ser. No. 60/447,791 filed Feb. 14, 2003.

BACKGROUND OF THE INVENTION

1. Field of the Invention

The present invention relates generally to wireless communications systems and more particularly, to calibration methods and structures in such systems.

2. Description of the Related Art

Performance of modern wireless communications equipment is typically limited by three factors: power & bandwidth, interference, and the wireless channel itself.

For example, the Federal Communications Commission has imposed power and bandwidth limitations on most communications bands (e.g., the 2.4 GHz ISM and the 5 GHz UNII bands) and these limitations limit the range and data rate of associated devices. Accordingly, systems that employ conventional modem and signal processing technologies may not be able to support future multimedia and other high data rate applications (e.g., streaming video).

In unlicensed communications bands, interference is a serious problem since multiple emitters may share the same frequency in an uncontrolled manner. Interference from other emitters significantly reduces system throughput.

Finally, the wireless channel limits overall performance due to large-scale propagation loss, multipath delay spread and temporal channel variation.

To counter these limitations, spatial processing of multiple antennae has been introduced. Spatial processing improves overall system performance and may be implemented in a variety of wireless devices (e.g., ranging from wireless local area network (WLAN) access points to handheld personal digital assistants (PDA)). To be effective, however, spatial processing requires calibration techniques that compensate for amplitude and phase errors between spatial channels.

A conventional calibration method requires the addition of costly radio frequency hardware to transmit and receive calibration signals. For example, time-division duplex (TDD) systems generally share a plurality of transmitter and receiver hardware but add an additional RF transceiver exclusively for calibration. This added hardware is only used during the calibration process and is powered down during normal operation.

In addition, conventional calibration techniques generally analyze gain and phase imbalances at only one frequency within the signal bandwidth. Because gain and phase errors of broadband wireless devices may vary considerably between spatial channels over the receive or transmit bandwidth, these techniques lead to degraded system performance because of spatial channel mismatch at non-calibrated frequencies.

BRIEF SUMMARY OF THE INVENTION

The present invention is directed to wireless transceiver calibration methods and structures that compensate across a signal bandwidth for relative gain and phase errors between spatial communication channels while utilizing existing transceiver structures and facilitating the use of frequency-domain spatial processing.

The novel features of the invention are set forth with particularity in the appended claims. The invention will be best understood from the following description when read in conjunction with the accompanying drawings.

DETAILED DESCRIPTION OF THE INVENTION

Figure 1:
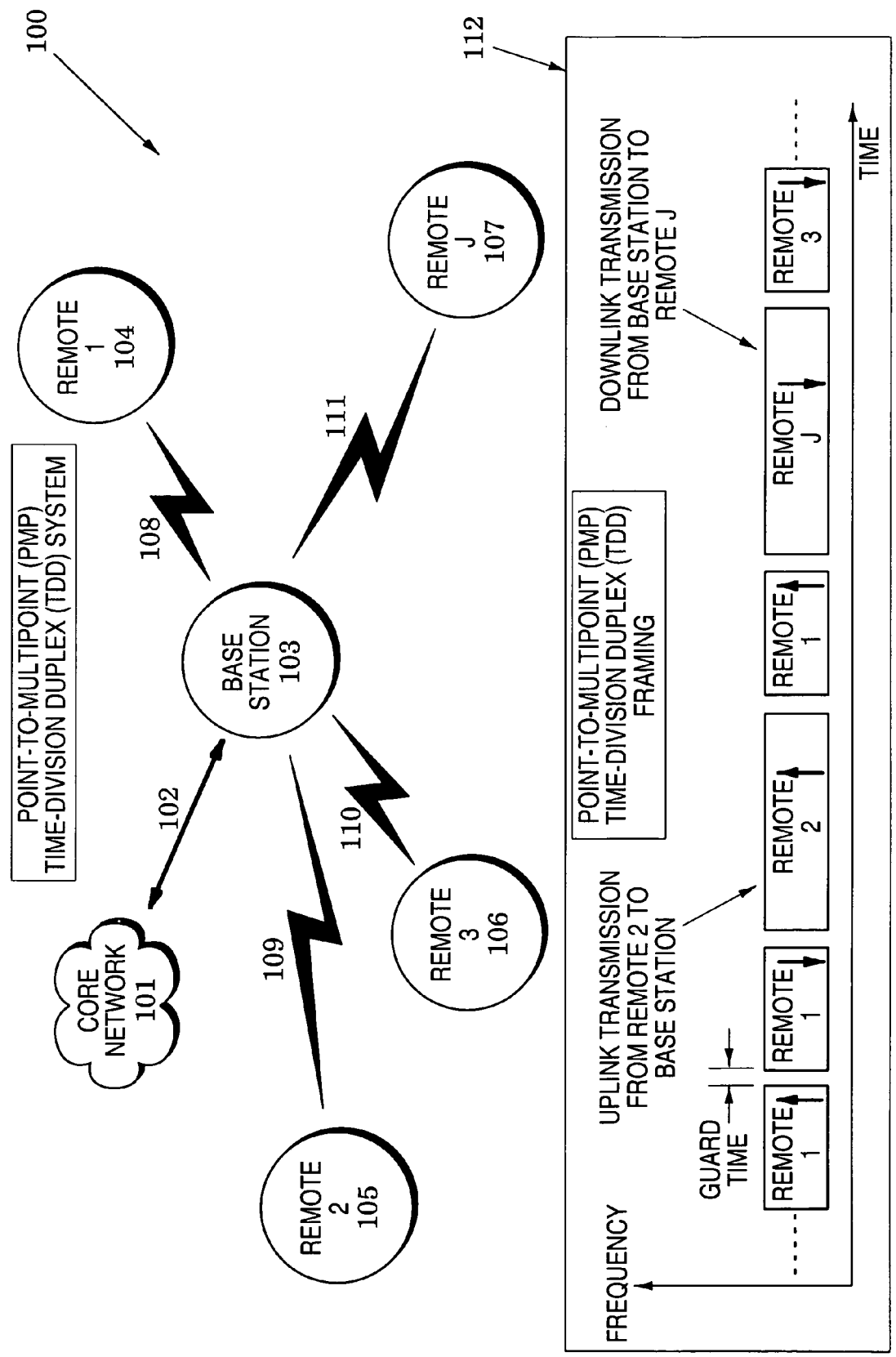
FIG. 1 is a block diagram that illustrates a wireless communications system of the present invention.
Figure 2:
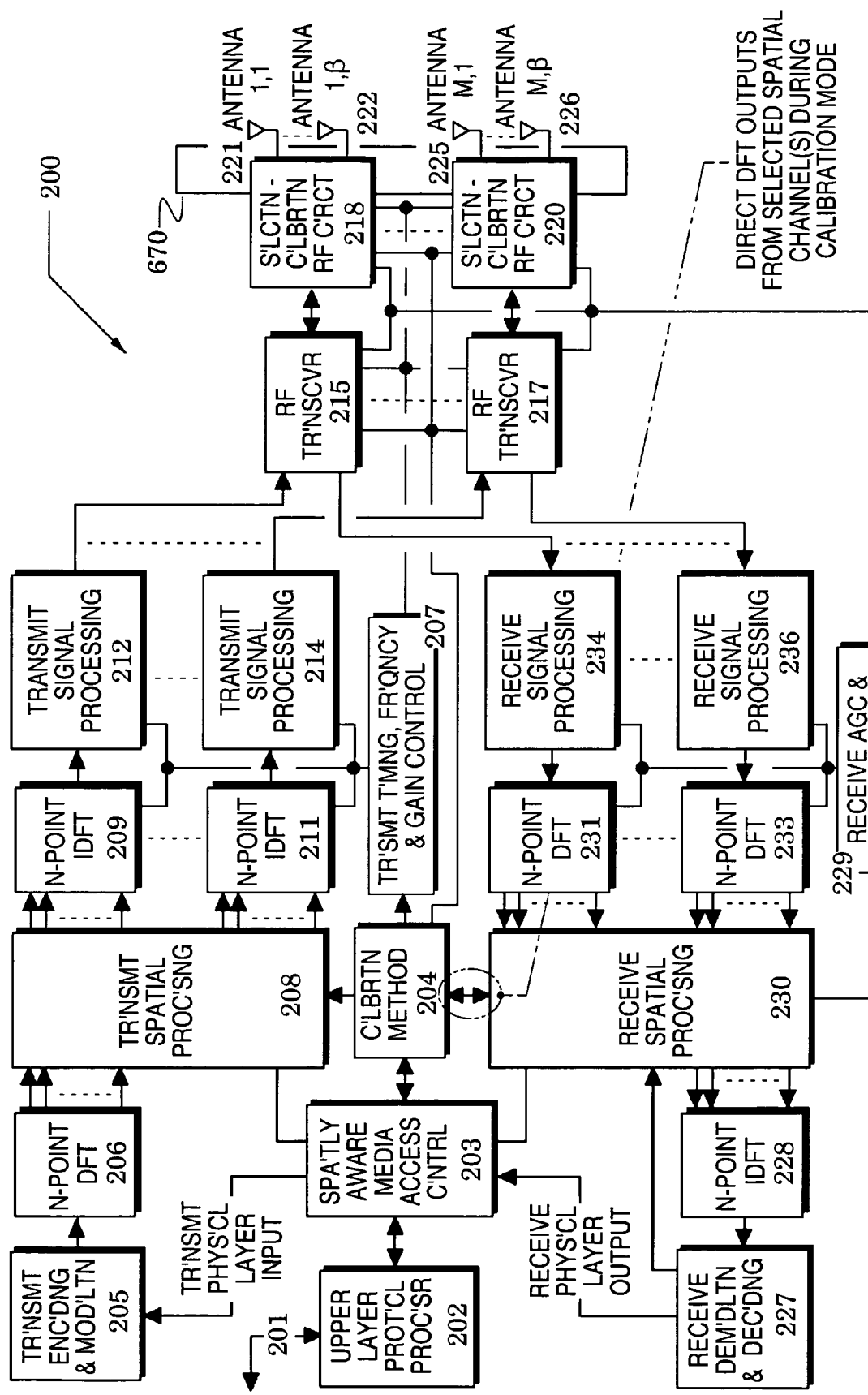
FIG. 2 is a block diagram that illustrates an embodiment of a wireless communications device in the communications system of FIG. 1.
Figure 3:
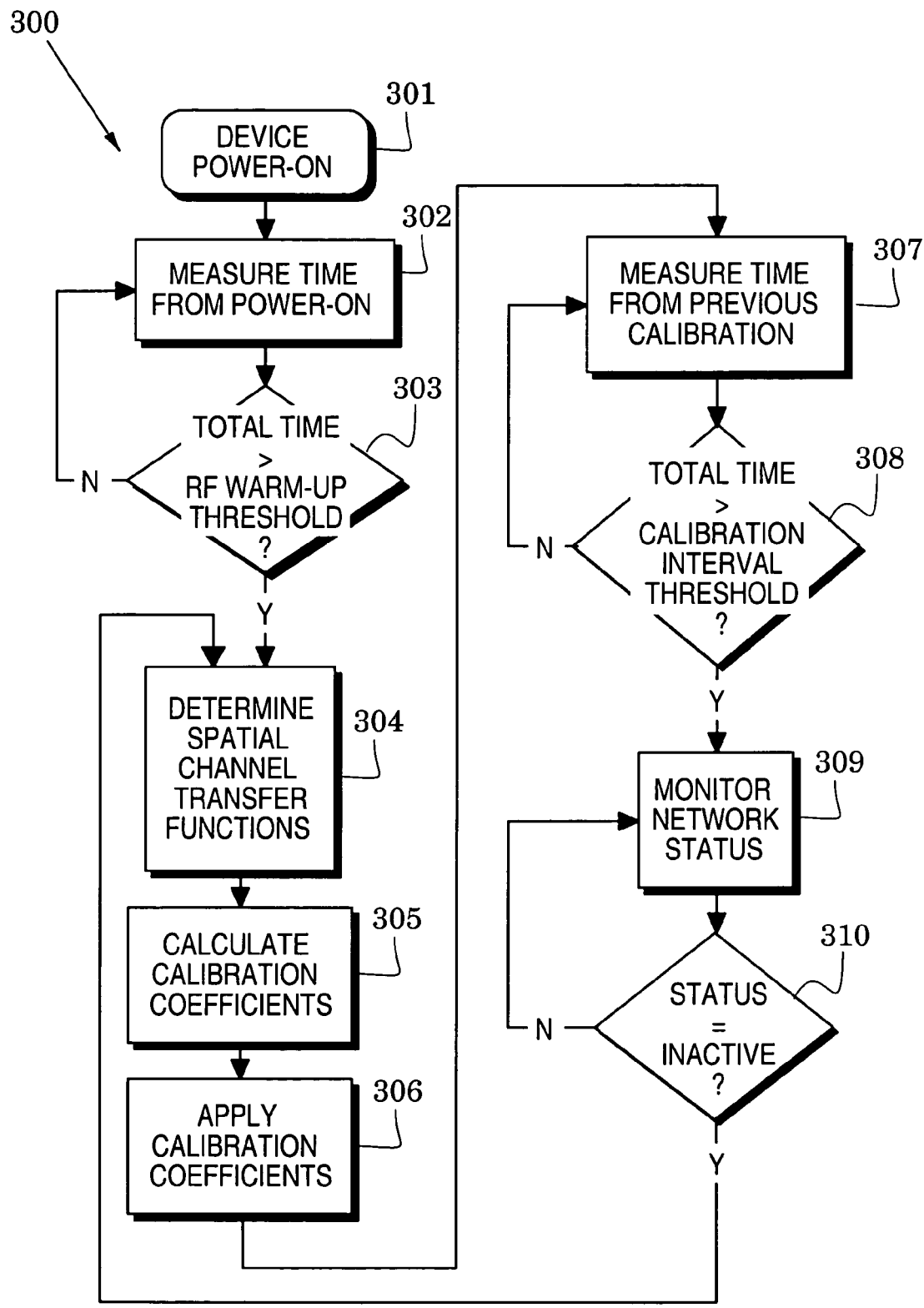
FIG. 3 is a flow-chart that introduces calibration processes in the wireless communications device of FIG. 2.

The present invention is particularly directed to wireless communications devices which may be advantageously used, for example, in the communications system 100 of FIG. 1. An embodiment 200 of a wireless communications device of the invention is shown in FIG. 2 and a flow chart 300 of FIG. 3 illustrates basic calibration processes in this unit. To enhance understanding of the processes of the flow chart 300, its description is preceded below with an examination of the elements of the system of FIG. 1 and the unit of FIG. 2. Receive and transmit processing details of the wireless communications device 200 are then described with reference to FIGS. 4 and 5.

Subsequently, a calibration structure embodiment is described with reference to FIG. 6 and the following description of FIG. 7 examines exemplary calibration processes that are realized with the calibration structure. Finally, a description of FIGS. 8-10 discloses OFDM transmission, reception and calibration signals that are suitable for use in the wireless communications device structures of FIGS. 2 and 6 (as applied, for example, to an IEEE Std. 802.11a embodiment).

Wireless communications devices of the invention generally include M transceivers which are each coupled between respective paths of transmit and receive spatial processing and at least one respective antenna. Each transceiver can thus be coupled to a selected one of its respective antennas to form one of its unit's M transmit spatial channels and M receive spatial channels.

In the transmit and receive spatial processing structures of the invention, complex multiplicative factors (i.e., weights) are applied to each spatial channel to maximize overall system performance in the presence of interference and propagation-related impairments (e.g., multipath fading). Similarly, complex multiplicative calibration coefficients are applied in these structures to each spatial channel to compensate for relative gain and phase errors due to hardware imperfections between the spatial channels.

Wireless communications devices of the invention are applicable to all time-division duplex (TDD) systems, and are particularly suited to those that incorporate OFDM.

In particular, FIG. 1 illustrates a point-to-multipoint (PMP) TDD wireless communications system 100 that comprises a base station 103 and a plurality of remote communication devices (e.g., wireless local area network (WLAN) clients and handheld personal digital assistants (PDA)). Information is exchanged between the base station 103 and remote devices 104, 105, 106 and 107 over wireless media paths 108, 109, 110 and 111. The transmission media for a high-speed backhaul communication link 102 between the base station and a core network 101 may be fiber, coaxial cable, wireless media, or even a transmission media of the future. Transmissions from the base station 103 to the remote devices 104-107 are referred to as downlink transmissions and transmissions from a remote device to the base station are referred to as uplink transmissions.

Diagram 112 of FIG. 1 illustrates a method of sharing a single frequency band between a plurality of remote devices (e.g., the devices 104-107) with TDD techniques. Exemplary time slots are shown for uplink communication from a remote device 1, downlink communication to the remote device 1, uplink communication from a remote device 2, uplink communication from remote device 1, downlink communication to a remote device J and downlink communication to remote device 3. Guard times temporally space the communication slots.

The wireless communications device 200 of FIG. 2 can be used to form at least a portion of the base station 103 and remote devices 104, 105, 106 and 107 of FIG. 1. To facilitate its description, FIG. 2 indicates pluralities of structures by using reference numbers that are spaced apart by one. For example, RF transceivers 215-217 indicates the presence of two or more transceivers.

The wireless communications device 200 of FIG. 2 includes a transmitter portion that comprises transmit encoding & modulation (abbreviated tr'nsmt enc'dng & mod'ltn) 205, N-point discrete Fourier transform (abbreviated DFT) 206, transmit timing, frequency and gain control (abbreviated tr'smt t'mng, fr'qncy & gain control) 207, transmit spatial processing (abbreviated tr'nsmt spatial proc'sng) 208, N-point inverse discrete Fourier transform (abbreviated N-point IDFT) 209-211, transmit signal processing 212-214, RF transceivers (abbreviated RF tr'nscvr) 215-217, selection-calibration RF circuits (abbreviated s'lctn-c'lbrtn rf c'rct) 218-220, and antennas 221-222 and 225-226.

The transmitter structures are serially connected in ascending order of their reference numbers (e.g., the DFT 206 is coupled between the transmit encoding & modulation 205 and the transmit spatial processing 208) except the transmit timing, frequency and gain control 207 which is coupled to access the IDFT 209-211, transmit signal processing 212-214, RF transceivers 215-217 and the selection-calibration RF circuits 218-220.

The wireless communications device 200 of FIG. 2 also includes a receiver portion that comprises receive demodulation and decoding (abbreviated dem'dltn & dec'dng) 227, N-point inverse discrete Fourier transform (abbreviated N-point IDFT) 228, receive automatic gain control (AGC) & synchronization 229, receive spatial processing (abbreviated receive spatial proc'sng) 230, N-point discrete Fourier transform (abbreviated N-point DFT) 231-233, receive signal processing 234-236, RF transceivers (abbreviated RF tr'nscvr) 215-217, selection-calibration RF circuits (abbreviated s'lctn-c'lbrtn rf c'rct) 218-220, and antennas 221-222 and 225-226.

The receiver structures are serially connected in ascending order of their reference numbers with the exception that the receive signal processing 234-236 is coupled to the previously described RF transceivers, selection-calibration RF circuits and antennas and with the further exception that the receive AGC & synchronization 229 is coupled to access the receive spatial processing 230, DFT 231-333, receive signal processing 234-236, RF transceivers 215-217 and the selection-calibration RF circuits 218-220.

The wireless communications device 200 further includes an upper layer protocol processor (abbreviated upper layer prot'cl proc'sr) 202, a spatially aware media access control (abbreviated spa'tly aware media access c'ntrl or SA-MAC) 203 and a calibration method (c'lbrtn method) 204 (the results of which may, for example, be stored in a suitable storage structure). The upper layer protocol processor 202 interfaces between upper network layers of the communication system and the spatially aware media access control 203 which receives physical layer outputs from the receive demodulation and decoding 227, provides transmit physical layer inputs to the transmit encoding & modulation 205 and communicates with receive spatial processing 230, the transmit spatial processing 208 and the calibration method 204.

In operation of the wireless communications device 200, the calibration methods of the invention are performed to measure the relative amplitude and phase errors of the receive and transmit hardware implementations for spatial channels 1 through M. During the initial system calibration mode, a set of frequency domain complex correction values or "calibration coefficients" is calculated and stored for eventual application in transmit spatial processing 208 and receive spatial processing 230, or in transmit spatial processing 208 alone (with receive calibration coefficients set to unity).

In a feature of the invention, the calibration coefficients are applied in the frequency domain to compensate for frequency-selective amplitude and phase errors between spatial channels. Calibration methods of the invention also include techniques for the updating of calibration coefficients during periods of network inactivity or when a particular system client or base station is not actively exchanging information with another system device.

After calibration, radio frequency switches in the selection-calibration RF circuits 218-220 are initialized in a known state and RF transceivers 215-217 are set to their receive mode in which a wireless signal is simultaneously received over antennas 221-226 (used hereinafter to refer collectively to antennas 221-222 and 225-226). The RF transceivers 215-217 amplify and convert the signals from a radio frequency to an intermediate frequency (IF) or to a baseband frequency. Each selection-calibration RF circuit 218-220 is controlled by the receive AGC & synchronization 229 to select one of the plurality of antennas based on received signal power, positive correlation of the received signal with a known reference, or another algorithm that maximizes diversity benefits.

To effectively process the signal with the stored spatial calibration methods, the receive AGC and synchronization 229 sets the gain of transceivers 215-217 so that their output signals are kept within the dynamic range of analog-to-digital converters (ADC) embodied in the receive signal processing 234-236. The receive AGC and synchronization 229 also corrects for timing and frequency offsets between channels and, accordingly, the lines connected to this unit represent a multiplicity of input and output signals used for timing, gain, and frequency control.

Receive signal processing 234-236 preferably includes a digital downconversion function that mixes the respective signals to baseband (0 Hz) and, optionally, digitally filters and reduces the sample rate of each spatial channel. The digital mix frequency is generated by the receive AGC and synchronization 229. Alternately, the interface to the RF transceivers 215-217 may be at baseband (0 Hz), thereby increasing the number of ADCs by a factor of two and changing the functionality of digital downconversion to only offset the receive frequency (around 0 Hz, as opposed to around a receive intermediate frequency, if required).

The choice of using IF or baseband sampling may be determined by cost, performance, and availability of implementation options. Receive signal processing 234-236 may also include additional functions, such as cyclic extension removal, as required to prepare the received signals for conversion into the frequency domain by the N-point DFT 231-233.

After the spatial channels have been transformed into the frequency domain, the receive spatial processing 230 calculates and applies one or more complex spatial weight vectors that have been calculated to an appropriate criteria (e.g., a minimum mean-squared error (MMSE) criteria). Receive spatial processing 230 also applies the receive calibration coefficients to the frequency domain signals.

The weight vectors and a time-stamp are passed to the SA-MAC 203 which correlates and stores the spatial information, or some transform thereof, as spatial weights with the decoded source address of the device (e.g., 104-107 of FIG. 1) that transmitted the uplink signal. The output of receive spatial processing 230 is then optionally processed by the N-point IDFT 228 based on whether the demodulating process is applied to time domain or frequency domain signals (for example, IDFT 228 is bypassed for an OFDM application).

The resultant signal is then processed by the receive demodulation and decoding 227 which performs conventional functions such as demodulation, demultiplexing, channel decoding, de-interleaving, de-scrambling, source decoding, and formatting. The output of the receive demodulation and decoding 227 is provided to the receive spatial processing 230 for decision-aided adaptation (e.g. decision-feedback) of spatial weights if such mode is deemed appropriate. The SA-MAC 203 also receives the output of the receive demodulation and decoding 227 and then parses the output and determines if the information should be passed through the upper layer protocol processor 202 for further processing. Processing in the receive mode is now complete.

In transmit mode, information is received from upper network layers through the upper layer protocol processor 202 and parsed in the SA-MAC 203 before being passed to the transmit encoding and modulation 205. The SA-MAC 203 examines the destination address of the transmit information and determines if a set of spatial weights are available from a prior signal reception within a pre-determined timeout period.

If these, and potentially other tests (e.g., determination of whether the message is unicast, multicast or broadcast), are true, then the SA-MAC 203 transfers the stored spatial weights to the transmit spatial processing 208. Otherwise, the SA-MAC 203 transfers a calculated set of weights to the transmit spatial processing 208. This calculation may be based on a mathematical combination of a plurality of stored weights (as with a multicast message) and reference weights, or on an omni-directional weight (as with broadcast messages or messages in which receive spatial information is either unavailable or unreliable).

Transmit encoding and modulation 205 includes conventional functions such as formatting, source encoding, scrambling, interleaving, channel encoding, multiplexing, and modulation. In OFDM systems, for example, the transmit encoding and modulation 205 maps data bits to symbols for data-carrying subcarriers and sets training tones to appropriate amplitudes and phases. The output of the transmit encoding and modulation 205 is then converted by DFT 206 to the frequency domain (DFT 206 is bypassed for an OFDM application).

Transmit spatial processing 208 receives the frequency domain signal representation and applies complex calibration coefficients to each spatial channel. The transmit spatial processing 208 also receives spatial weights, or some transform thereof, from the SA-MAC 203, and applies them to the corrected frequency domain representation of the transmit signal.

The order in which the transform is applied to the receive weights to generate a set of transmit weights and the storage/retrieval of these weights for use in transmission may be juxtaposed. Similarly, the order of application of calibration coefficients and spatial weights to the frequency domain representation of the transmit signal may be juxtaposed. Furthermore, the receive weights may be transformed to transmit weights and calibration coefficients may be applied prior to storage and retrieval and application to the frequency domain transmitted signal. The order of these processes is substantially determined by response time requirements, architecture, and implementation of the SA-MAC 203.

The transmit timing, frequency and gain control 207 generates timing signals that may be used to delay the output of the IDFT 209-211 if alignment with other sources is required as in, for example, orthogonal frequency division multiple access (OFDMA) or space division multiple access (SDMA). The transmit timing, frequency and gain control 207 also provides frequency control signals to transmit spatial processing 212-214 that may be used to offset or otherwise control the transmit frequency in OFDMA, SDMA, or other applications. Accordingly, the lines connected to the transmit timing, frequency and gain control 207 represent a multiplicity of input and output signals used for timing, frequency, and gain control.

The output of the transmit spatial processing 208 is converted by the N-point IDFT 209-211 to the time domain and these signals are processed by the transmit signal processing 212-214 which include conventional functions such as cyclic extension, digital upconversion, and digital to analog conversion.

The converted signal is then passed to RF transceivers 215-217 along with the control signals generated by the transmit timing, frequency and gain control 207. Alternately, the interface to the RF transceivers 215-217 may be at baseband (0 Hz), thereby increasing the number of digital-to-analog converters by a factor of two and changing the functionality of transmit signal processing 212-214 to only offset the transmit frequency (around 0 Hz, as opposed to around a transmit IF) under the control of the transmit timing, frequency and gain control 207, if required. The choice of using IF or baseband sampling may be determined by cost, performance, and availability of implementation options.

The RF transceivers 215-217 are set to the transmit mode by signals originating from the transmit timing, frequency and gain control 207. These transceivers amplify and convert the signals from baseband or an intermediate frequency to a radio frequency. The gain of these transceivers may, for example, be set 1) based on implementation requirements related to linearity of the transceiver and the modulation used, 2) by regulatory requirements related to spectral emissions or maximum power output requirements, or 3) with a closed loop power control that uses a) information from the receiver, b) channel reciprocity based on the strength of signals recently received from the intended destination, or c) other criteria.

The selection of antennas connected to the selection-calibration RF circuits 218-220 is determined from a prior reception and provided by the SA-MAC 203. The wireless signal is simultaneously transmitted over selected antennas from the set of antennas 221-226. The transmit processing sequence is now complete.

To reduce the processing resources required for implementation of the methods of the invention, all DFT functions (206 and 231-233) may be replaced by Fast Fourier Transform (FFT) functions. Conversely, all IDFT functions (228 and 209-211) may be replaced by Inverse Fast Fourier Transform (IFFT) functions.

The flow chart 300 of FIG. 3 describes an embodiment of calibration processes of the wireless communications device of FIG. 2. After device power-on in initiator 301, process step 302 and decision 303 cooperatively monitor time until the total on time exceeds a predetermined RF warm-up threshold time. This time delay stabilizes gain and phase responses of RF circuits embodied within the RF transceivers (215-217 in FIG. 2) to a steady-state condition. The total time required for warm-up is a function of mechanical design and its thermal dissipation characteristics, types of semiconductor devices employed, and other factors.

Process step 304 determines spatial channel transfer functions. For example, the selection-calibration RF circuits 218-220 of FIG. 2 are realized in FIG. 6 to include a conduction network 670 which permits any selected spatial channel in the transmit mode to couple signals to other spatial channels in the receive mode. Appropriate RF switches are actuated in FIG. 6 to guide a calibration signal to the receiving spatial channels and to block it from being unintentionally transmitted from one or more of the antennas (613-620 in FIG. 6).

To determine the individual transmit and receive functions of each spatial channel, a predetermined calibration signal is generated within the transmit spatial processing (208 in FIG. 2) under the control of the calibration methods (204 in FIG. 2), and applied to one of the spatial channels. Although the calibration signal can be any type of signal, it preferably has a predetermined frequency domain signature.

During the calibration process, the spatial weights and calibration coefficients applied within the transmit spatial processing (208 in FIG. 2) and the receive spatial processing (230 in FIG. 2) are set to unity or some other known value, or the application of these quantities is completely bypassed. The calibration source signal is converted into the time domain by the associated N-point IDFT (209-211), and conditioned, as required, by an associated one of the transmit signal processing blocks (212-214 in FIG. 2) before being output to an associated one of the RF transceivers (215-217 in FIG. 2).

Assuming, for example, that RF transceiver 215 of FIG. 2 is placed in transmit mode, the calibration signal is received (via associated selection-calibration RF circuits) by others of the RF transceivers and is processed by corresponding ones of the receive signal processing (234-236 in FIG. 2), before being converted into the frequency domain by N-point DFTs (231-233 in FIG. 2). The receive DFT outputs from the associated spatial channels are then collected, averaged as required, and stored for further processing in accordance with the calibration method 204 of FIG. 2. This process is then repeated with a different spatial channel transmitting until sufficient information is captured to determine the relative transfer functions (receive and transmit) of each spatial channel.

An important and novel feature of the invention is that the determination of absolute transfer functions is not required to determine calibration coefficients. Rather, by setting at least one receive transfer function and one transmit transfer function to unity (unity gain and zero phase), the relative transfer functions for all other receivers and transmitters may be derived in a minimal hardware implementation.

The absolute receive and transmit functions for the $m^{th}$ spatial channel are defined as $H_{ARXm}(f)$ and $H_{ATXm}(f)$. The relative transfer functions for the $m^{th}$ spatial channel, assuming the $r^{th}$ spatial channel as the reference, are:

$$H_{RXm}(f) = \frac{H_{ARXm}(f)}{H_{ARXr}(f)}$$

$$H_{TXm}(f) = \frac{H_{ARXm}(f)}{H_{ATXr}(f)}$$

In the remainder of this detailed description of the invention, spatial channel one is assumed to be the reference channel in both receive and transmit, resulting in unity values for $H_{RX1}(f)$ and $H_{TX1}(f)$:

$$H_{RX1}(f) = \frac{H_{ARX1}(f)}{H_{ARX1}(f)} = 1$$

$$H_{TX1}(f) = \frac{H_{ATX1}(f)}{H_{ATX1}(f)} = 1$$

In practice, any spatial channel could be designated as the reference channel. Unless otherwise indicated with the appropriate subscript "Axxx", all transfer functions included herein are relative.

One method embodiment for calculating the calibration coefficients for spatial channel 2 is to calculate its receive calibration coefficient $cr_2(f)$, as the inverse of its receive transfer function $H_{RX2}(f)$ and its transmit calibration coefficient as the inverse of its transmit transfer function $H_{TX2}(f)$ as indicated below (transfer functions and coefficients are shown as a function of frequency, rather than DFT bins, to preserve generality):

$$cr_2(f) = \frac{1}{H_{RX2}(f)}$$

$$ct_2(f) = \frac{1}{H_{TX2}(f)}$$

That is, the product of calibration coefficient and associated transfer function is unity. The calibration coefficients for other spatial channels are obtained by replacing "2" in the above equations with the spatial channel number (1 through M).

Another method embodiment for calculating calibration coefficients sets the receive calibration coefficients to unity. In this embodiment, it is assumed that the spatial weights generated by the receive spatial processing (230 in FIG. 2)

include compensation for any differential gain and phase errors between receive spatial channels. Stated differently, the generated receive spatial weights will reflect not only the communications channel, but also the differential gain and phase errors between receive spatial channels. In this embodiment, the equations for spatial channel 2 are:

$$cr_2(f) = 1$$

$$ct_2(f) = \frac{\alpha_{RX2}(f)}{H_{TX2}(f)}$$

in which $\alpha_{RX2}(f)$ is a complex-valued variable that is a function of the measured receive transfer function $H_{RX2}(f)$, receiver gain settings, and other factors. The factor $\alpha_{RX2}(f)$ removes the effect of differential receive errors which are embedded in the receive spatial weights.

The determination of the factor $\alpha_{RX2}(f)$ depends on the type of receive spatial processing algorithm and how it processes differential errors between spatial channels. This factor may be dynamic, based on whether the receive subsystem is thermal or quantization noise limited, for example. As in the first embodiment, the calibration coefficients for other spatial channels may be obtained by replacing "2" in the above equations with the spatial channel number (1 through M).

The calculated calibration coefficients are then applied in process step 306 of FIG. 3 and as further described below with reference to functions of the transmit spatial processing 208 and the receive spatial processing 230. After this application, elapsed time is measured in process step 307 and compared to a calibration interval threshold in decision 308.

When decision 308 determines that the elapsed time exceeds the calibration interval threshold, the method monitors the status of the communication network in process step 309 and compares this status to an inactive status in decision 310. When decision 310 determines that the network is inactive, it reports this to process step 304 to permit recalculation and reapplication of calibration coefficients. Process steps 304-306 are thus repeated during network inactive periods that occur after each calibration interval threshold.

The network inactive interval for one remote device may occur, for example, when a base station (103 in FIG. 1) is addressing another remote device (104-107 in FIG. 1). In exemplary IEEE Std 802.11a-1999 systems, network activity may be determined using either physical carrier sense or virtual carrier sense mechanisms.

Figure 4:
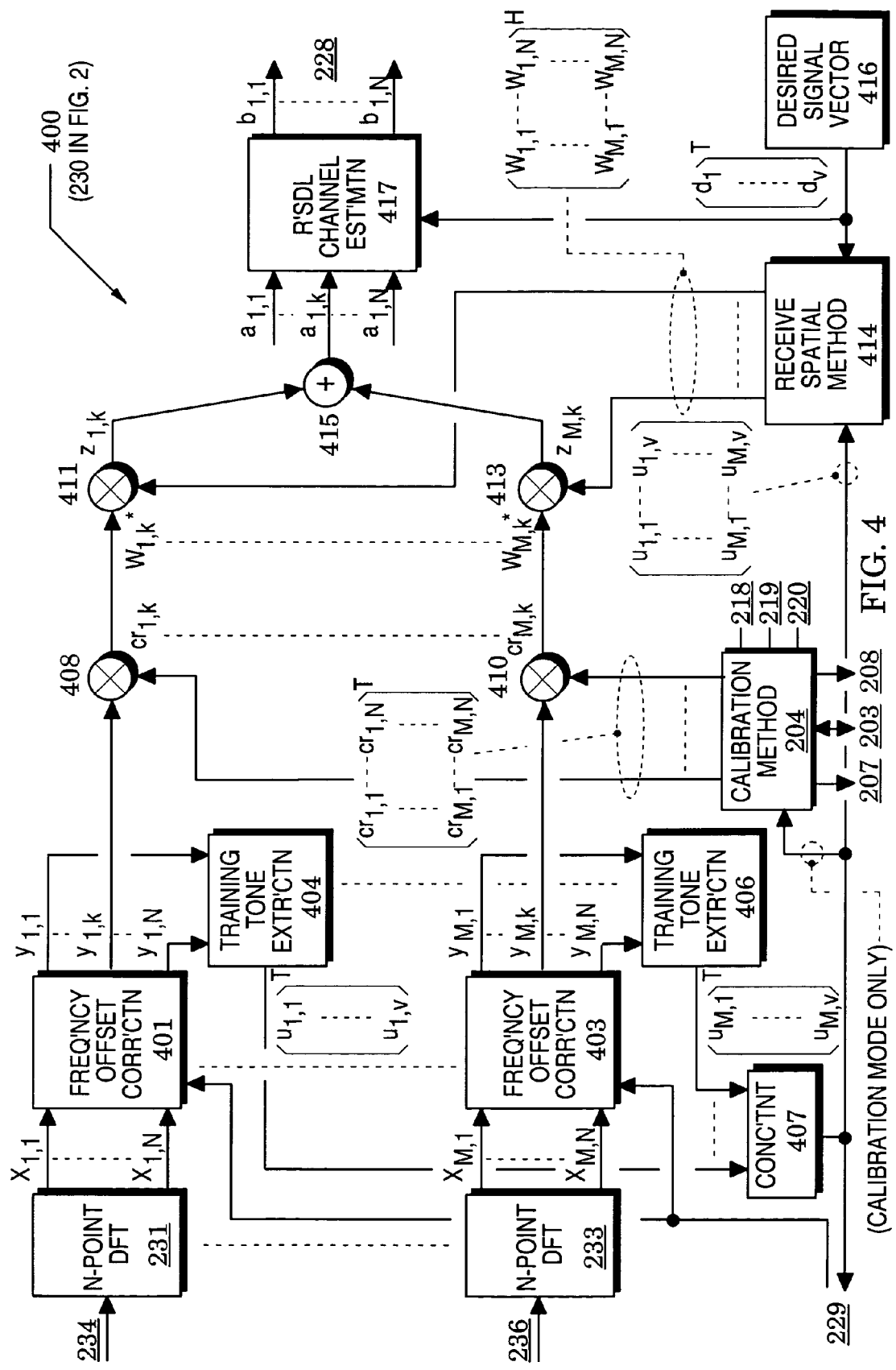
FIG. 4 is a block diagram that illustrates an embodiment of receive spatial processing in the wireless communications device of FIG. 2.

FIG. 4 illustrates an embodiment 400 of the receive spatial processing 230 of FIG. 2 wherein DFTs 231-233 and the calibration method 204 were introduced in FIG. 2 and a time index for frequency domain signals $nT_{DFT}$ is not shown for the sake of clarity.

The frequency domain signals from each receive spatial processing channel 1 through M are, optionally, compensated for frequency error by frequency offset correction (freq'ncy offset corr'ctn) 401-403 (under control of the receive AGC and synchronization 229 of FIG. 2). This function is optional since in some embodiments it is possible to correct for frequency error prior to the DFT operations.

The source of the frequency offset may, for example, be RF local oscillator differences, sampling frequency errors, or other implementation-related factors. Frequency offset correction 401-403 is preferably capable (with any of various frequency-correction methods) of correcting for a different frequency offset on each DFT output bin (1 through N) if the sampling frequency offset is not corrected prior to the DFTs 231-233.

FIG. 4 assumes that one or more training, or known reference, tones are received in the frequency domain. The total number of training tones is denoted as "v", where $v \leq N$. Training tone extraction (training tone extr'ctn) 404-406 extracts the training tones from the output of frequency offset correction 401-403. The input signal vector of length M for the $i^{th}$ training tone is defined as $$u_i(n) = \begin{bmatrix} u_{1,i}(n) \\ u_{2,i}(n) \\ \vdots \\ u_{M,i}(n) \end{bmatrix}$$

in which M is the number of spatial channels. It is noted that the notation specifies a discrete time vector sampled at $t = nT_{DFT}$. In response to the extracted training tones, concatenate (conc'tnt) 407 provides an M×v signal matrix of v training tones as:

$$u(n) = \begin{bmatrix} u_{1,1}(n) & u_{1,2}(n) & \ldots & u_{1,v}(n) \\ u_{2,1}(n) & u_{2,2}(n) & \ldots & \vdots \\ \vdots & \vdots & \ddots & \vdots \\ u_{M,1}(n) & u_{M,2}(n) & \ldots & u_{M,v}(n) \end{bmatrix}$$

This training tone matrix is provided to the receive AGC and synchronization (229 in FIG. 2), the calibration method 204 and to a receive spatial method 414.

After the frequency offset correction process and extraction of toning tones, the calibration method 204 applies the following matrix cr (n) of complex receive calibration coefficients to the outputs of frequency offset correction 401-403

$$cr(n) = \begin{bmatrix} cr_{1,1}(n) & cr_{1,2}(n) & \ldots & cr_{1,N}(n) \\ cr_{2,1}(n) & cr_{2,2}(n) & \ldots & \ldots \\ \vdots & \vdots & \ddots & \ldots \\ cr_{M,1}(n) & \vdots & \vdots & cr_{M,N}(n) \end{bmatrix}^T$$

In particular, FIG. 4 illustrates the application of the $cr_{1,k}$ through $cr_{M,k}$ coefficients to the kth frequency domain output ($y_{1,k}$ through $y_{M,k}$)-via multipliers 408-410. To preserve digital signal processing resources, some embodiments of the invention may only directly measure/calculate a subset of NM possible complex coefficients using interpolation or some other technique to indirectly obtain those that remain.

As stated above, the receive spatial method 414 receives the training tone matrix. It also receives a desired signal vector 416 wherein a desired signal, or reference, that corresponds to the $i^{th}$ training tone is a scalar value $d_i(n)$ and the desired signal vector 416 for v training tones is a 1×v vector defined as:

$$d(n) = [d_1(n) d_2(n) \ldots d_v(n)]$$

In response, the receive spatial method 414 calculates the weight matrix of FIG. 4 using single-tone adaptation, multitone adaptation, or extensions thereof which include methods for reducing processing overhead such as commutating single-tone adaptation on various tones over time.

Single-tone adaptation calculates a separate M×1 weight vector from each training tone, while multi-tone adaptation produces a single M×1 weight vector from a group of training tones. The single-tone or multi-tone algorithms are adapted to MMSE (minimum mean-squared error) or other criteria.

The receive spatial method 414 performs interpolation as necessary to construct the entire M×N weight matrix. In most cases, the dimension of the weight matrix will be less than M×N since many systems have some tones that are set to zero in order to reduce implementation complexity, thereby reducing the size of the matrix.

In particular, the Hermitian transpose of a unique M×1 weight vector is applied to multipliers 411-413 along with the output of multipliers 408-410 as indexed by "k". The multipliers 411-413 and adder 415 illustrate the weight vector multiplication for a single output indexed by k. It is noted that a total of MN multipliers and N adders are required if the entire M×N weight matrix is applied.

The final function of receive spatial processing, residual channel estimation (r'sdl channel est'mtn) 417, corrects for any remaining phase and amplitude errors in the received frequency domain signal. Such errors could be the result of a system with a sparse number of training tones (thereby introducing interpolation-related errors), or in multi-tone adaptation where a 'best-fit' spatial weight vector is calculated for a group of training tones. It is an optional function, and is not required in every embodiment of the invention. If implemented, however, its output is sent to the SA-MAC 228 of FIG. 2 for further processing.

In calibration mode, the concatenate 407 passes the DFT outputs to the calibration method 204 so that the gain and phase of the received calibration signal (on up to M−1 spatial channels) may be ascertained. Although not shown in FIG. 4, this information could also be captured after the transmit calibration coefficient multipliers (408-410) or the spatial weight multipliers (411-413) as long as the values of calibration coefficients and spatial weights, respectively, were set to unity or some other fixed value during calibration.

Figure 5:
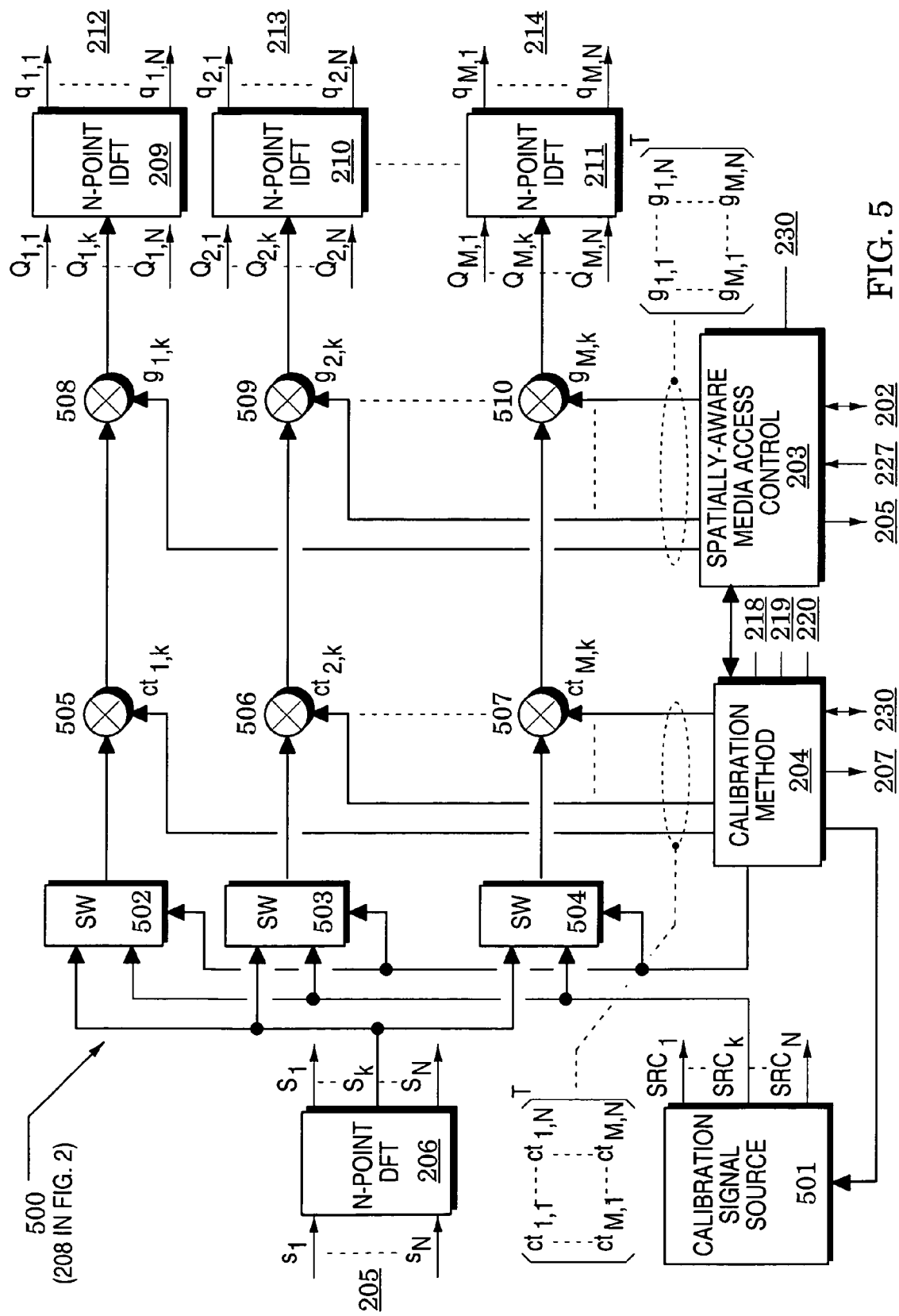
FIG. 5 is a block diagram that illustrates an embodiment of transmit spatial processing in the wireless communications device of FIG. 2.

FIG. 5, illustrates an embodiment 500 of the transmit spatial processing 208 of FIG. 2 wherein the time index for frequency domain signals, $nT_{DFT}$, is not shown for the sake of clarity. The frequency domain outputs, $S_1$ through $S_N$, of the N-point DFT 206 are distributed to all spatial channels (1 through M) as inputs to switches 502-504. Any one of these switches, under the control of the calibration method 204 and SA-MAC 203, may be actuated to pass a calibration signal generated by a calibration signal source 501.

The outputs of the switches 502-504 are multiplied by the following matrix, ct(n) of complex transmit calibration coefficients that is supplied by the calibration method 204

$$ct(n) = \begin{bmatrix} ct_{1,1}(n) & ct_{1,2}(n) & \cdots & ct_{1,N}(n) \\ ct_{2,1}(n) & ct_{2,2}(n) & \cdots & \cdots \\ \vdots & \vdots & \ddots & \cdots \\ ct_{M,1}(n) & \vdots & \vdots & ct_{M,N}(n) \end{bmatrix}^T$$

In particular, FIG. 5 illustrates the application of the $ct_{1,k}$ through $ct_{M,k}$ to the kth frequency domain output ($S_k$) via multipliers 505 through 507. To preserve digital signal processing resources, some embodiments may only directly measure/calculate a subset of NM possible complex coefficients, using interpolation or some other technique to indirectly obtain those that remain.

The spatially aware media access control 203 calculates a unique M×1 transmit weight vector for the kth frequency domain output. Along with the outputs of the calibration coefficient multipliers 505-507, the transmit weight vector is applied to multipliers 508-510. These multipliers provide the weight vector multiplication for the kth frequency domain output. As stated elsewhere in this disclosure, the order in which the calibration coefficients and transmit weights are applied may be juxtaposed. Finally, the outputs of multipliers 508-510 are provided to N-point IDFTs 209-211 (IDFT 210 was not shown in FIG. 2) which transform the processed signals into the time domain.

FIGS. 2-5 thus illustrate a wireless communications device embodiment which includes M transceivers and associated antennas to thereby facilitate the formation of M receive spatial channels and M transmit spatial channels with associated frequency-domain spatial processing. The invention recognizes, however, that signal transmissions and receptions through portions of the spatial channels (especially through RF portions) will inevitably vary for a variety of practical realities (e.g., variations in fabrication tolerances) even in structures that have been designed to minimize such variations. These signal variations will induce differences in the gain and phase transfer functions of the spatial channels which will induce gain and phase errors in the transmit and receive processing.

Figure 6:
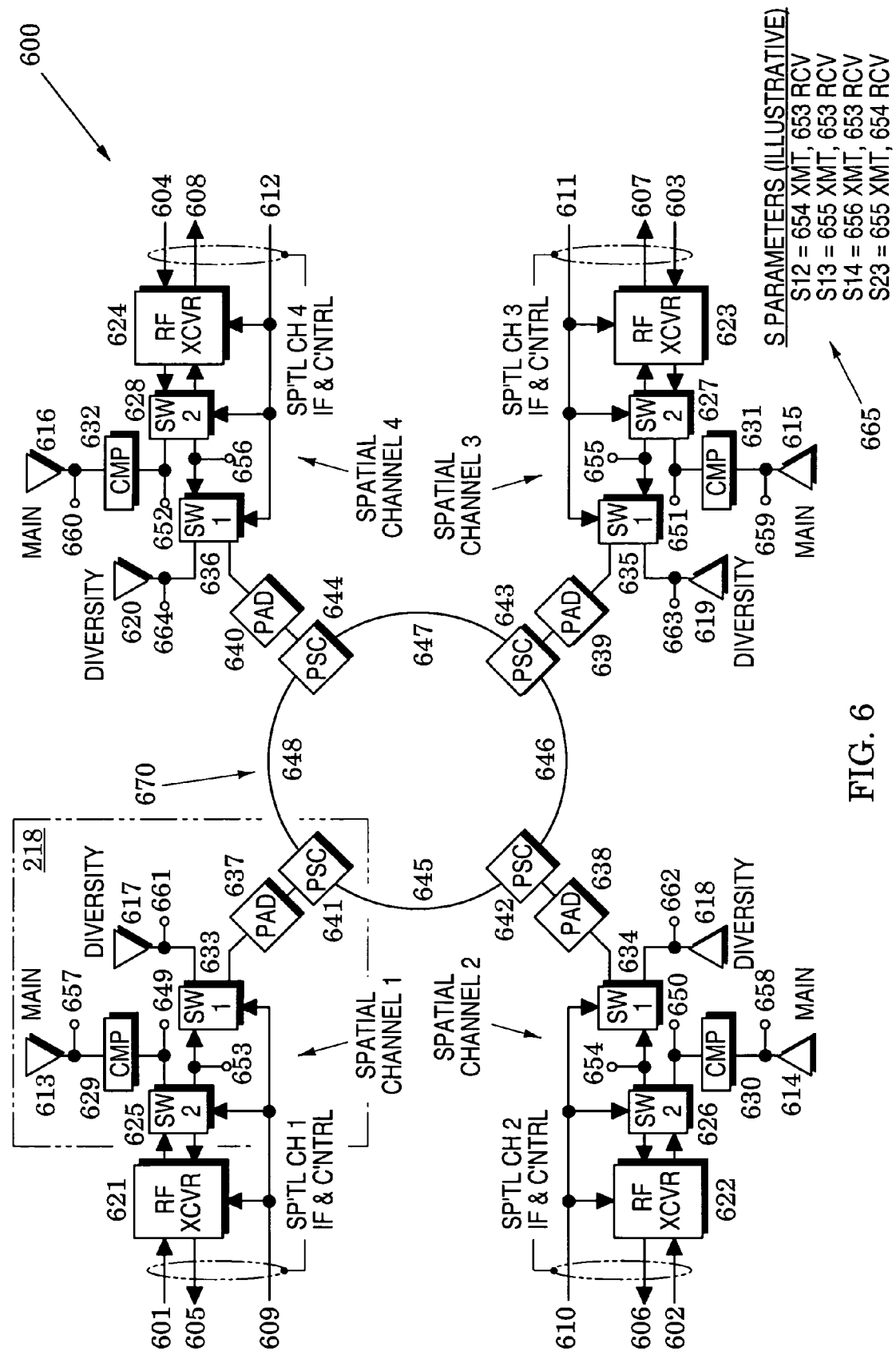
FIG. 6 is a block diagram that illustrates radio frequency structures of an embodiment of the selection and calibration RF circuits of FIG. 2 wherein the structures include a conduction network that facilitates calibration.
Figure 7A:
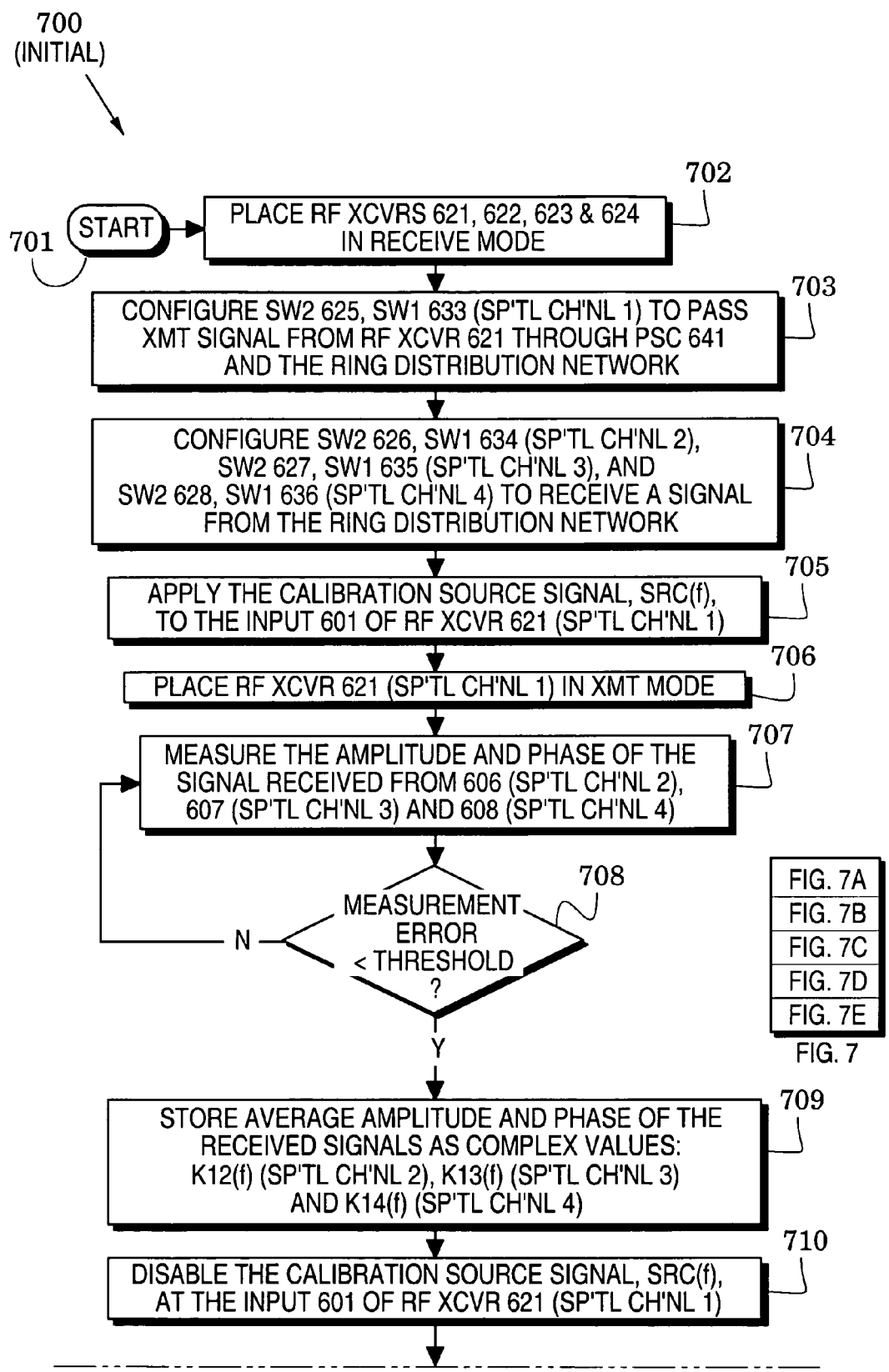
FIG. 7 is a flow-chart that illustrates calibration processes in the selection and calibration RF circuits of FIG. 6.
Figure 7B:
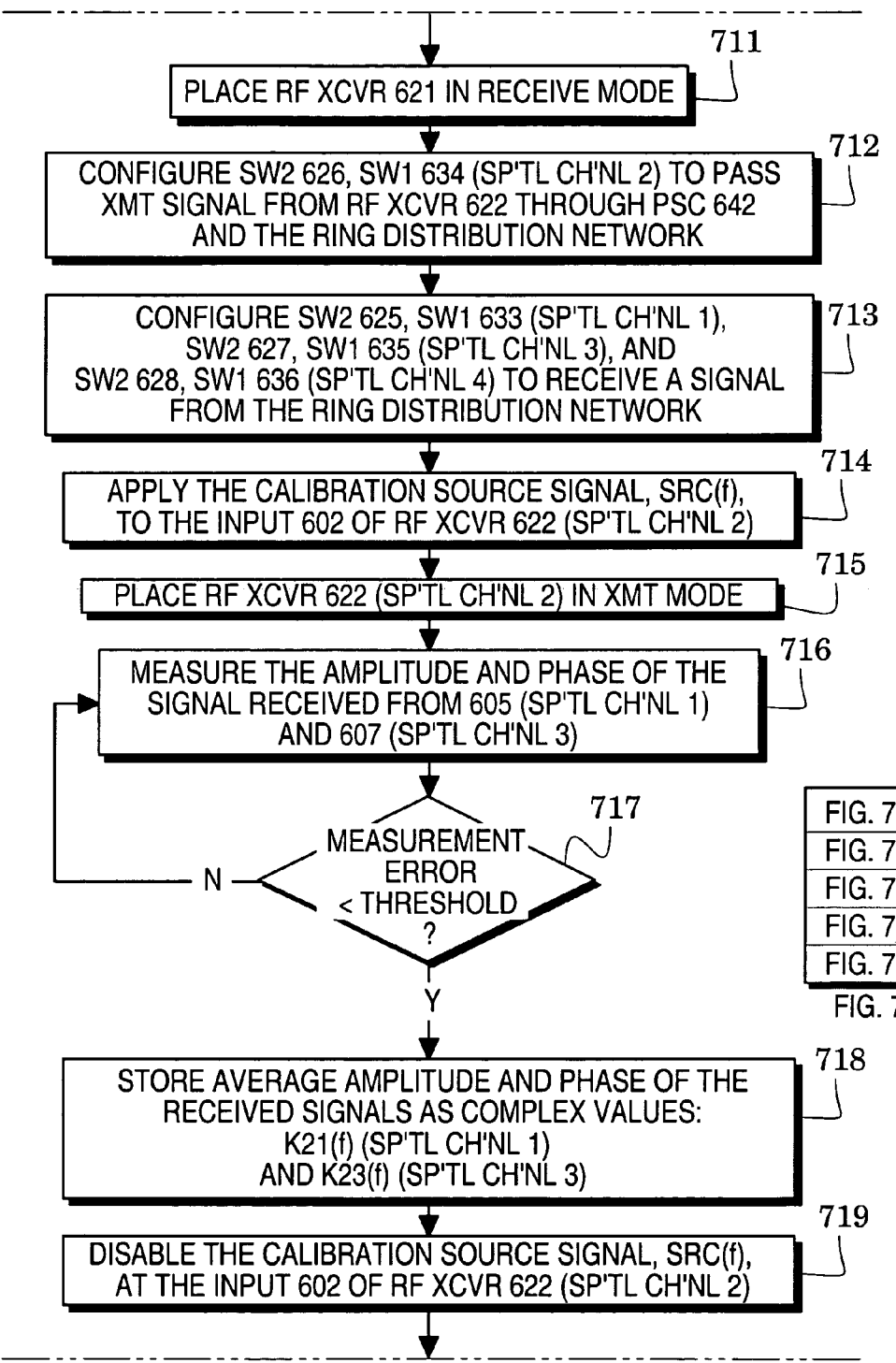
Figure 7C:
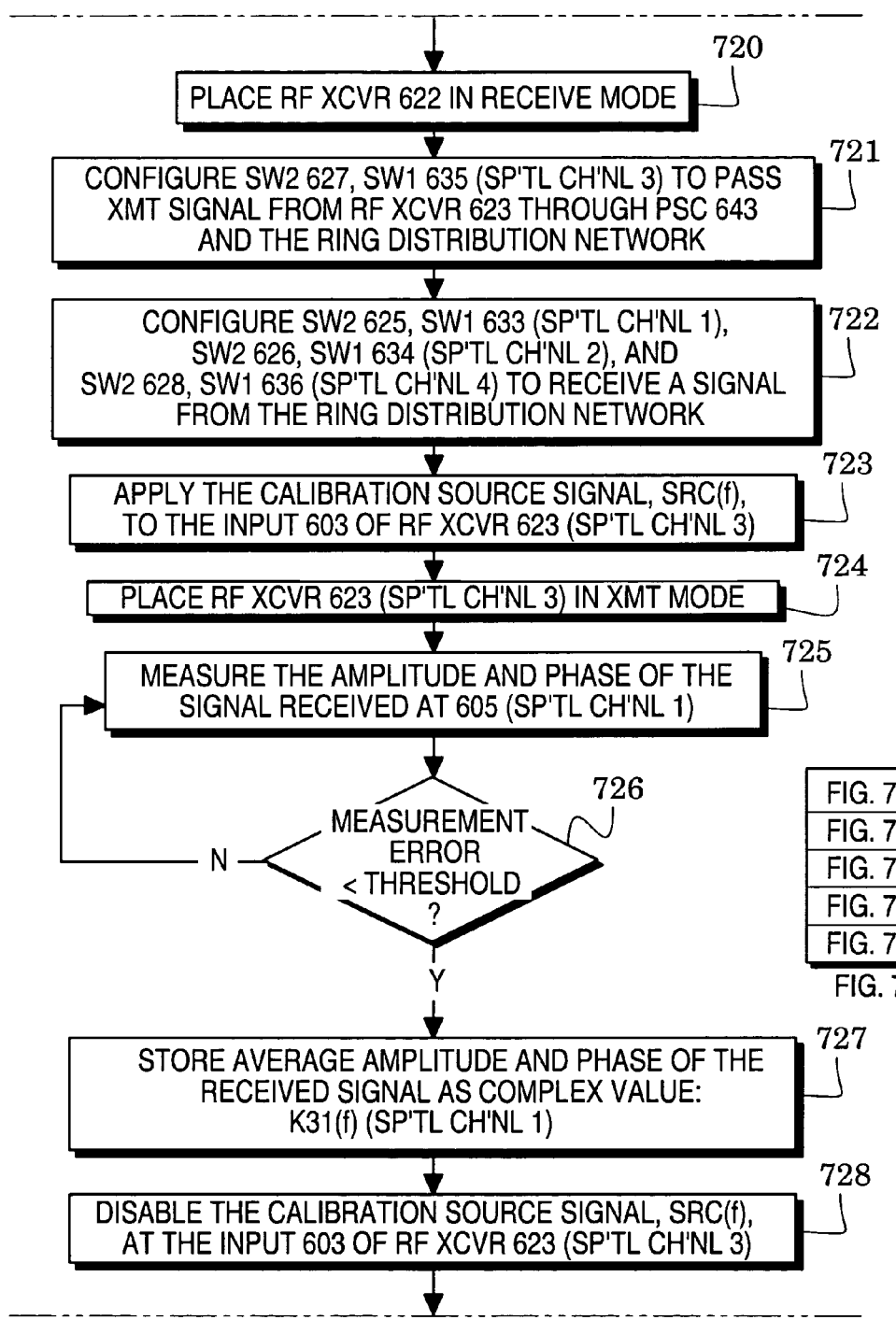
Figure 7D:
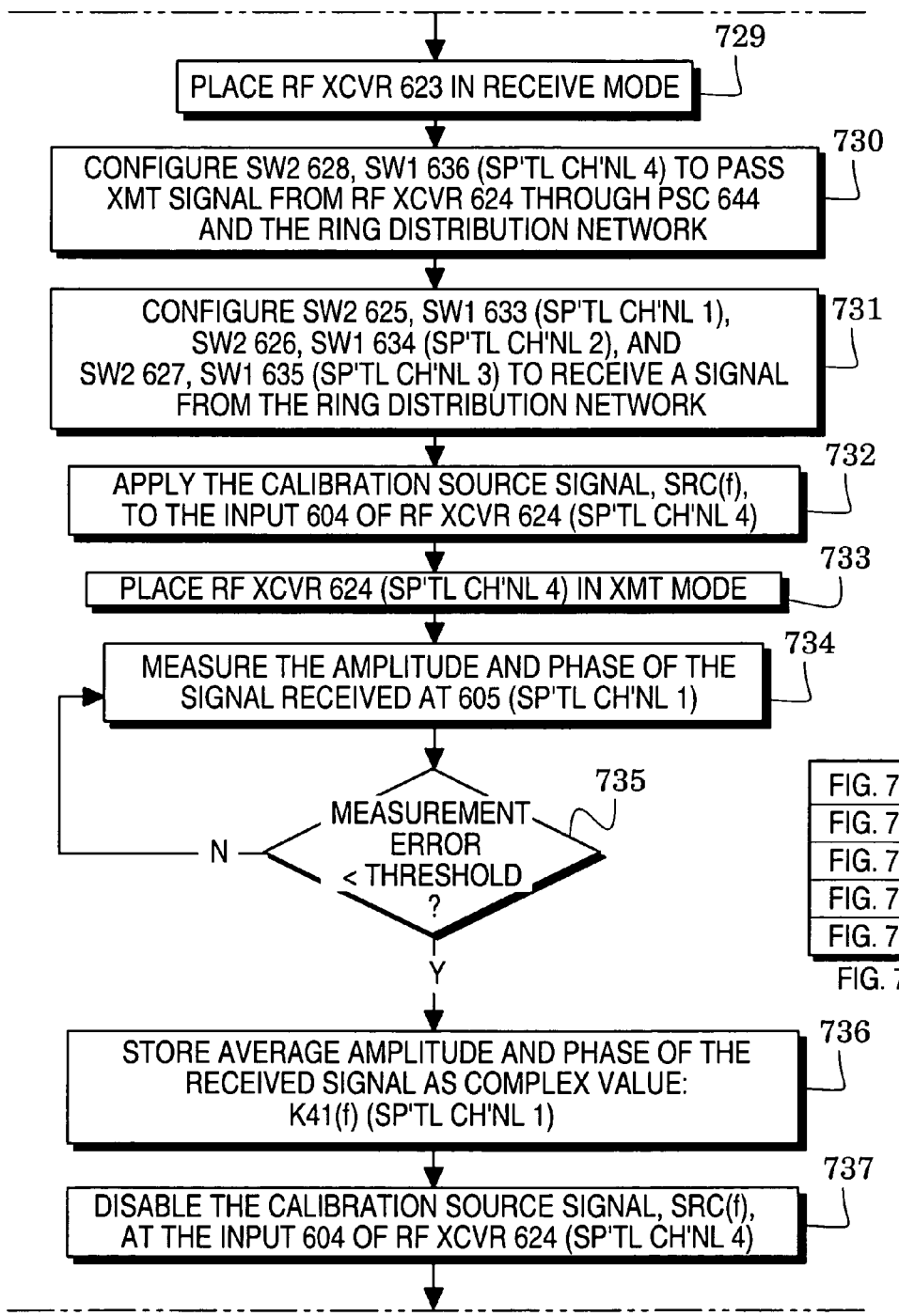
Figure 7E:
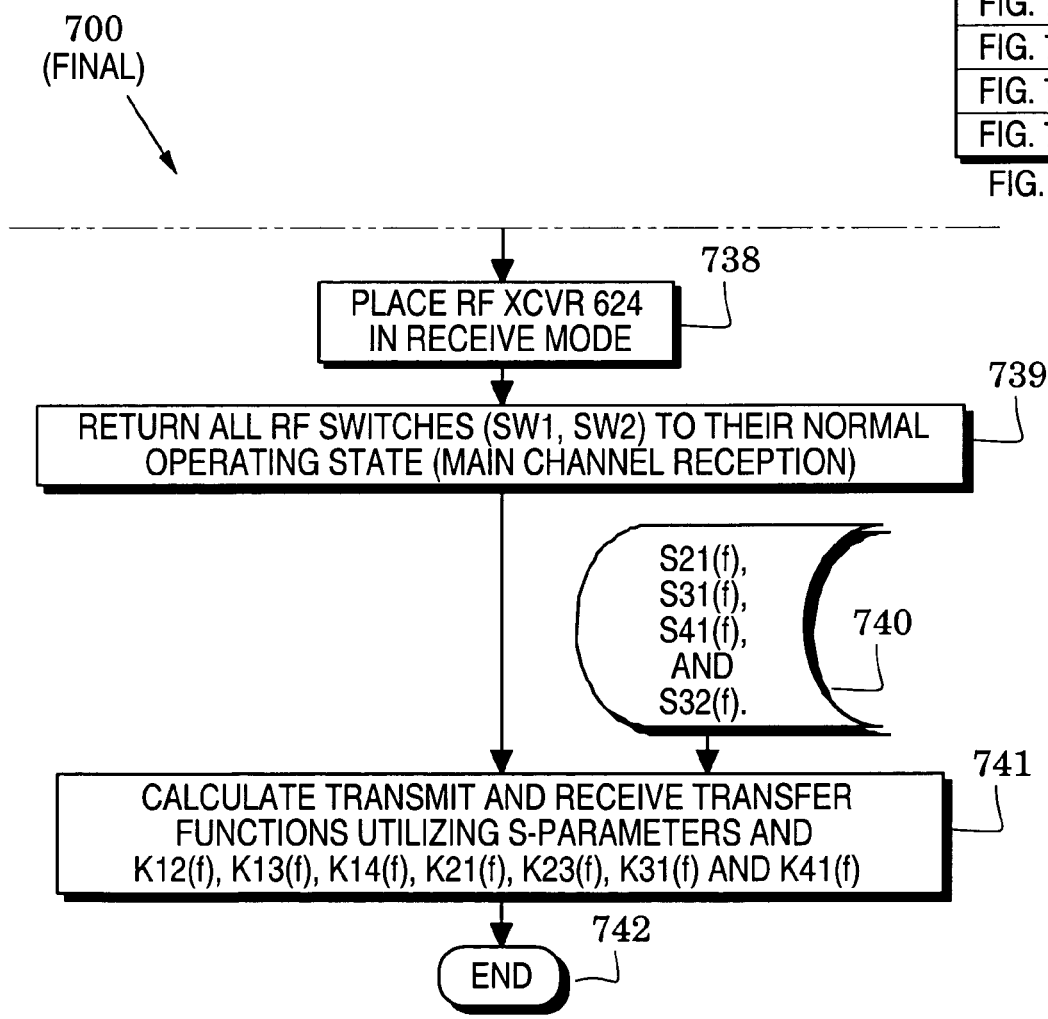

Accordingly, FIG. 6 includes a conduction network which facilitates calibration processes that essentially correct the signal variations. In particular, FIG. 6 illustrates an embodiment 600 of the RF transceivers, selection-calibration RF circuits and antennas that were introduced in FIG. 2. As mentioned above, each of the RF transceivers is part of an associated receive spatial channel and an associated transmit spatial channel. Although the receive spatial processing 400 of FIG. 4 and the transmit spatial processing 500 of FIG. 5 complete these spatial channels, these elements are not shown in FIG. 6 for clarity of illustration. Although these lower-frequency structures do not substantially contribute to the gain and phase errors, references to spatial channels in the following description should be understood to include such structures.

FIG. 6 generally indicates spatial channels 1 through 4 and describes receive and transmit structures associated with each of these channels. Signal interfaces in FIG. 6 include control (c'ntrl) signals 609-612, IF signals 601-608, RF test points (e.g., RF test connectors) 649-664 and antennas 613-620. Each spatial channel's control signal represents, for example, a plurality of signals originating from the SA-MAC 203, the calibration method 204, the transmit timing, frequency and gain control 207 and the receive AGC and synchronization 229 of FIG. 2.

FIG. 6 also includes a conduction network 670 formed by transmission-line segments 645-648 that couple passive splitter/combiners (PSC) 641-644. Passive attenuators (PAD) 637-640 are placed in series with each PSC and form the ports of the conduction network. The segments 645-648 can be realized with various transmission-line structures (e.g., microstrip) and in one embodiment, can be arranged as a circular conduction ring.

When one of the four spatial channels is placed in transmit mode, signals from that channel travel around the conduction network 670 and are received by the other channels. The RF test points 649-664 are especially suited for determining the conduction parameters of the conduction network 670. In accordance with the invention, the conduction parameters are mathematically eliminated from introducing errors in the calibration process after a sufficient number of gain and phase measurements have been completed.

Exemplary conduction parameters are the conventional scattering parameters which describe transmission and reflection of RF signals at each port of an n-port system. The scattering parameter $S_{12}$, for example, is the ratio of the output signal from port 1 to the incident signal at port 2. As illustrated in table 665 of FIG. 6, $S_{12}$ can be determined by sourcing a signal through RF test point 654 and receiving the output signal through RF test point 653. If the conduction network 670 is passive, then S21=S12, S31=S13 and so on. It is intended that the RF test points 649-664 would typically be accessed only during the manufacturing or product build processes and would not need to be used subsequently, e.g., during real-time calibration.

In more detail, FIG. 6 includes RF transceivers 621-624 which represent a four channel embodiment (i.e., spatial channels 1-4) of the RF transceivers 215-217 of FIG. 2. SW2 switches 625-628 are each a double-pole/double-throw switch that connects an associated RF transceiver to an associated main antenna (of main antennas 613-616) or to an associated SW1 switch (of 633-636). In turn, the SW1 switches are each a single-pole/double-throw switch that connects to either the conduction network 670 or an associated diversity antenna (of 617-620). In some embodiments, SW1 switches could be replaced by passive couplers.

In a calibration mode of the invention, the SW1 switches (633-636) are switched to electrically couple each of the SW2 switches (625-628) to a respective one of the PADs 637-640. The PADs reduce the level of signal received by the remaining transceivers and, during normal operation, provide additional isolation between structural elements.

In an exemplary calibration process, spatial channel 1 is selected as a calibration signal source and RF signals from the transceiver 621 are accordingly coupled through SW2 switch 625 and SW1 switch 633 to PAD 637 which passes an attenuated version through passive splitter/combiner (PSC) 641 to the conduction network 670. The transmit signal travels around the conduction ring and enters PSCs 642, 643, and 644, where it is further attenuated respectively by PADs 638, 639 and 640 and routed respectively to associated RF transceivers 622-624.

Under normal operating conditions, the selection of the main or diversity antenna may be made independently on each spatial channel by actuating SW2 625-629. In this mode, SW1 633-636 must be set so that the RF transceivers are isolated from the calibration ring, thereby minimizing any RF leakage that could degrade performance and/or violate RF emissions regulations.

On a given spatial channel, the delay from the diversity antenna input to SW2 is larger than the delay from the main antenna input to SW2 since the signal received on the diversity antenna must also pass through SW1. Since RF test points 653-656 are between SW2 and SW1, this difference is not included in the S-parameter measurement of the conduction network. Compensation circuits 629-632 compensate for the transfer function of SW1 633-636. One embodiment of these circuits is through passive layout to match the electrical delay length of each spatial channel's SW1. For example, the circuit realized in spatial channel 1 between 657 and 649 would match the delay between 661 and 653.

Alternately, the delay can be compensated by including an additional calibration correction factor for each element when diversity antennas are selected. This correction factor can be accurately determined through design layout and component analysis or in a manufacturing environment utilizing test points 649-664. Although the conduction network 670 is configured in FIG. 6 to connect four spatial channels, it can in general be configured for any number of spatial channels.

The flow chart 700 of FIG. 7 describes processes for determining transmit and receive transfer functions for the transceivers 621-624 of FIG. 6. Because of illustrative limitations, FIG. 7 is broken into five portions labeled 7A-7E which connect at broken lines to form the combined figure as is also indicated in a diagram on each of the portions.

Steps 702-710 describe the transmission of calibration signals over spatial channel 1 and receptions over spatial channels 2, 3 and 4. In particular, step 702 places all transceivers in their receive mode, steps 703 and 704 configure the SW1 and SW2 switches to direct signals from transceiver 621 through the conduction network 670 to transceivers 622, 623 and 624 (note: the conduction network is generally referred to as the ring distribution network in FIG. 7), step 705 turns on the calibration signal source (501 in FIG. 5) and step 706 places transceiver 621 in its transmit mode.

Transceivers 622, 623 and 624 receive signals and interface to other functional blocks that measure the amplitude and phase of received signals in process step 707, the amplitudes and phase are stored as complex values in step 709 and the calibration signal source is disabled in step 710. In order to reduce effects of measurement perturbation sources (e.g., system noise) decision 708 requires that the amplitude and phase be remeasured until the measurement error is less than a predetermined error or, alternately, until a predetermined number of samples have been collected.

In a similar manner, process steps 711-719 describe transmission of calibration signals over spatial channel 2 and reception on spatial channels 1 and 3. Process steps 720-728 describe transmission of calibration signals over spatial channel 3 and reception on spatial channel 1. Finally, process steps 729-737 describe transmission of calibration signals over spatial channel 4 and reception on spatial channel 1.

These process steps represent the minimum amount of data capture, without redundancy, that is required to solve for the transmit and receive transfer functions of the spatial channels 1 through 4 (and subsequent determination of transmit and receive calibration coefficients). Although they generally require additional calibration time, various other method embodiments may be used to capture additional data that provides increased averaging or supports different calibration approaches.

Process steps 738 and 739 return the RF hardware to the normal operation state and process steps 740-742 are examined below with the aid of Table 1 which defines the transfer functions for an M=4 unit such as the wireless transceiver unit 600 of FIG. 6. Table 1 also lists the minimum number of required S-parameters. It is noted that transfer functions and S-parameters are shown as a function of frequency, rather than DFT bins, to preserve generality. As previously noted, this

TABLE 1

S-parameter and Relative Transfer Function Definitions
(with reference to FIGS. 4, 5 and 6)

| Parameter | Description | Source Reference | Sink Reference |
| --- | --- | --- | --- |
| S12(f) | S-parameter | 654 | 653 |
| S13(f) | S-parameter | 655 | 653 |
| S14(f) | S-parameter | 656 | 653 |
| S23(f) | S-parameter | 655 | 654 |

TABLE 1-continued

S-parameter and Relative Transfer Function Definitions
(with reference to FIGS. 4, 5 and 6)

| Parameter | Description | Source Reference | Sink Reference |
|---|---|---|---|
| $H_{TX1}(f)$ | Spatial channel 1 transmit relative transfer function | 501 | 653 |
| $H_{TX2}(f)$ | Spatial channel 2 transmit relative transfer function | 501 | 654 |
| $H_{TX3}(f)$ | Spatial channel 3 transmit relative transfer function | 501 | 655 |
| $H_{TX4}(f)$ | Spatial channel 4 transmit relative transfer function | 501 | 656 |
| $H_{RX1}(f)$ | Spatial channel 1 receive relative transfer function | 653 | 407 |
| $H_{RX2}(f)$ | Spatial channel 2 receive relative transfer function | 654 | 407 |
| $H_{RX3}(f)$ | Spatial channel 3 receive relative transfer function | 655 | 407 |
| $H_{RX4}(f)$ | Spatial channel 4 receive relative transfer function | 656 | 407 | invention derives calibration coefficients based on relative, not absolute, transfer functions of the spatial channels. Table 1 shows, for example, that S-parameter S12 is determined by a signal source at test point 654 of FIG. 6 and a signal sink at test point 653.

The minimum data capture shown in FIG. 7 is sufficient to determine the transmit and receive transfer functions for the transceivers of FIG. 6. As previously noted, $H_{TX1}(f)$ and $H_{RX1}(f)$ are both unity since spatial channel one is the reference for both transmit and receive.

$$H_{TX1}(f)=1$$

$$H_{RX1}(f)=1$$

Next, M−1 equations are derived to express the received calibration signals with the reference transmit spatial channel as the source of the calibration signal, SRC(f).

$$K12(f)=SRC(f)H_{ATX1}(f)S21(f)H_{ARX2}(f)$$

$$K13(f)=SRC(f)H_{ATX1}(f)S31(f)H_{ARX3}(f)$$

$$K14(f)=SRC(f)H_{ATX1}(f)S41(f)H_{ARX4}(f)$$

In a similar manner, M−1 equations are derived to express the received calibration signals with the reference receive spatial channel as the sink of the calibration signal (note that S21=S12, S31=S13, and S41=S14 because the conduction network is passive).

$$K21(f)=SRC(f)H_{ATX2}(f)S12(f)H_{ARX1}(f)=SRC(f)H_{ATX2}(f)S21(f)H_{ARX1}(f)$$

$$K31(f)=SRC(f)H_{ATX3}(f)S13(f)H_{ARX1}(f)=SRC(f)H_{ATX3}(f)S31(f)H_{ARX1}(F)$$

$$K41(f)=SRC(f)H_{ATX4}(f)S14(f)H_{ARX1}(f)=SRC(f)H_{ATX4}(f)S41(f)H_{ARX1}(f)$$

Finally, one remaining equation with neither reference spatial channel (transmit or receive) is required to solve for the relative transfer functions.

$$K23(f)=SRC(f)H_{ATX2}(f)S32(f)H_{ARX3}(f)$$

With these 2(M−1)+1 equations, simple algebraic techniques are utilized to solve for the remaining relative transfer functions, beginning with $H_{TX2}(f)$. Taking the ratio of K23(f) to K13(f) results in:

$$\frac{K23(f)}{K13(f)} = \frac{SRC(f)H_{ATX2}(f)S32(f)H_{ARX3}(f)}{SRC(f)H_{ATX1}(f)S31(f)H_{ARX3}(f)}$$

The common terms in the numerator and denominator, SRC(f) and $H_{ARX3}(f)$, cancel out and the ratio of $H_{ATX2}(f)$ to $H_{ATX1}(f)$ is the relative transfer function $H_{TX2}(f)$. This equation then simplifies to:

$$\frac{K23(f)}{K13(f)} = \frac{H_{TX2}(f)S32(f)}{S31(f)}$$

Rearranging terms produces an expression for $H_{TX2}(f)$:

$$H_{TX2}(f) = \left(\frac{K23(f)}{K13(f)}\right)\left(\frac{S31(f)}{S32(f)}\right)$$

Similarly, the expression for $H_{RX3}(f)$ is obtained by first expressing the ratio of K21(f) to K23(f).

$$\frac{K21(f)}{K23(f)} = \frac{SRC(f)H_{ATX2}(f)S21(f)H_{ARX1}(f)}{SRC(f)H_{ATX2}(f)S32(f)H_{ARX3}(f)}$$

The terms SRC(f) and $H_{ATX2}(f)$ cancel out and the ratio of $H_{ARX3}(f)$ to $H_{ARX1}(f)$ is the relative transfer function $H_{RX3}(f)$:

$$\frac{K21(f)}{K23(f)} = \frac{S21(f)}{S32(f)H_{RX3}(f)}$$

Rearranging terms produces an expression for $H_{RX3}(f)$:

$$H_{RX3}(f) = \left(\frac{K23(f)}{K21(f)}\right)\left(\frac{S21(f)}{S32(f)}\right)$$

The remaining equations are solved by algebraic substitution until a complete set of relative transfer functions, shown below, is obtained.

$$H_{TX1}(f)=1$$

$$H_{TX2}(f) = \left(\frac{K23(f)}{K13(f)}\right)\left(\frac{S31(f)}{S32(f)}\right)$$

$$H_{TX3}(f) = \left(\frac{K23(f)}{K13(f)}\right)\left(\frac{K31(f)}{K21(f)}\right)\left(\frac{S21(f)}{S32(f)}\right)$$

$$H_{TX4}(f) = \left(\frac{K23(f)}{K13(f)}\right)\left(\frac{K41(f)}{K21(f)}\right)\left(\frac{S21(f)}{S32(f)}\right)\left(\frac{S31(f)}{S41(f)}\right)$$

$$H_{RX1}(f) = 1$$

$$H_{RX2}(f) = \left(\frac{K23(f)}{K13(f)}\right)\left(\frac{K12(f)}{K21(f)}\right)\left(\frac{S31(f)}{S32(f)}\right)$$

$$H_{RX3}(f) = \left(\frac{K23(f)}{K21(f)}\right)\left(\frac{S21(f)}{S32(f)}\right)$$

$$H_{RX4}(f) = \left(\frac{K23(f)}{K13(f)}\right)\left(\frac{K14(f)}{K21(f)}\right)\left(\frac{S21(f)}{S32(f)}\right)\left(\frac{S31(f)}{S41(f)}\right)$$

With the transmit transfer function $H_{TX1}(f)$ set to one, the transmit transfer function $H_{TX2}(f)$ is given by a ratio of the amplitude and phase measurements $K23(f)$ and $K13(f)$ which were made through transceivers 622 and 623 of FIG. 6 as they received signals from the common transceiver 621. This ratio is modified with a ratio of the conduction parameters $S31(f)$ and $S32(f)$ which were preferably made during fabrication of the conduction network 670 of FIG. 6.

The transfer functions are then utilized to calculate the calibration coefficients as previously described. In example above, unity gain and zero phase was assumed for the transfer functions of spatial channel 1 (transmit and receive). Various different equations can be developed by selecting other channels as references. Equations for wireless transceiver units with different numbers of spatial channels follow from the methods and processes described above.

Figure 8:
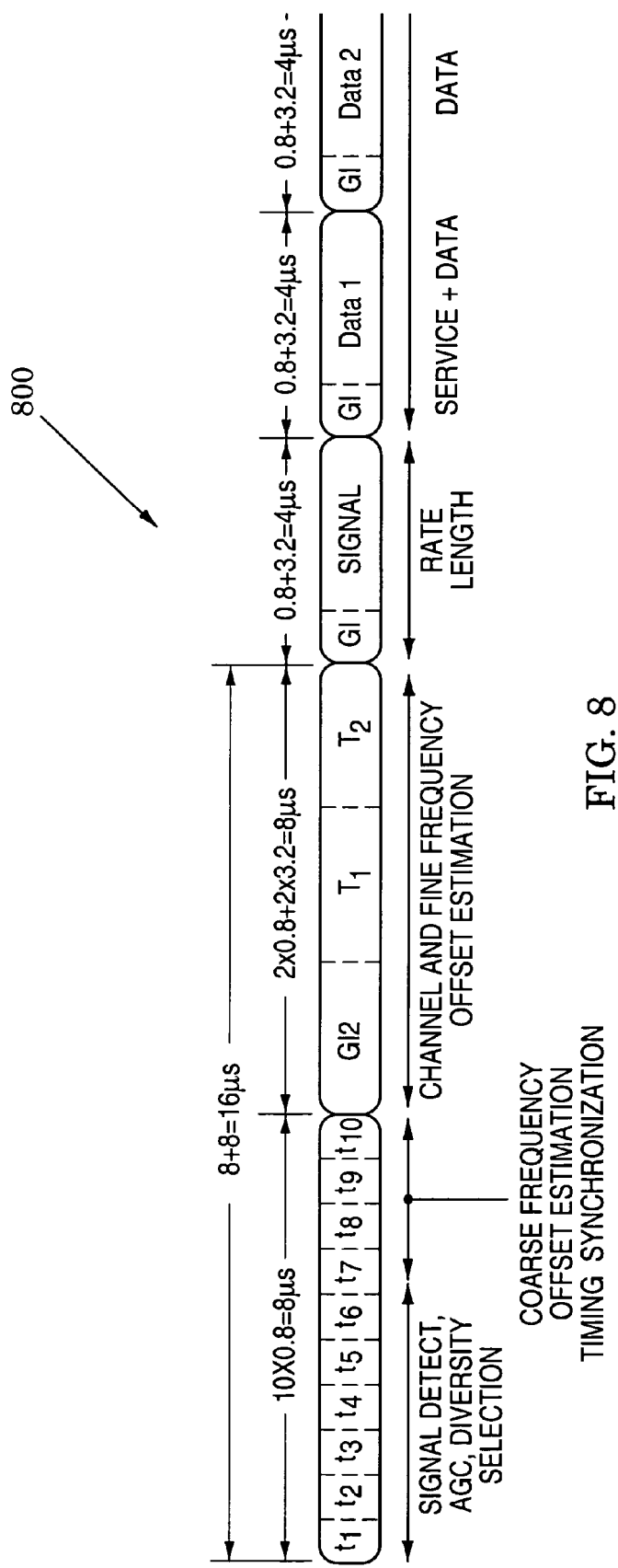
FIG. 8 illustrates an orthogonal frequency division multiplexing (OFDM) signal defined in Institute of Electrical and Electronic Engineers (IEEE) standard (Std.) 802.11a, FIG. 9 illustrates frequency-domain locations for training and data subcarriers in the signal of FIG. 8.

As shown in the time-domain signal 800 of FIG. 8, the OFDM signal defined in IEEE Std 802.11a-1999 consists of a 16 microsecond preamble followed by a signal frame which is used for control purposes and further followed by data frames. In a corresponding embodiment of the invention, short training symbols $t_1$ through $t_{10}$ in the preamble of FIG. 8 are generated with 12 modulated subcarriers in the frequency domain wherein all other subcarriers are zero. The scale factor sqrt(13/6) in the following expression $S_{-26,26}$ for the subcarriers is necessary to normalize the average power of the OFDM symbol.

$S_{-26, 26}$=sqrt(13/6)×{0, 0, 1+$j$, 0, 0, 0, −1−$j$, 0, 0, 0,
1+$j$, 0, 0, 0, −1−$j$, 0, 0, 0, −1−$j$, 0, 0, 0, 1+$j$, 0, 0,
0, 0, 0, 0, −1−$j$, 0, 0, 0, −1−$j$, 0, 0, 0, 1+$j$, 0, 0,
0, 1+$j$, 0, 0, 0, 1+$j$, 0, 0, 0, 1+$j$, 0, 0}

When $S_{-26,26}$ is transformed into the time domain by a 64-point IDFT (transforms are generally limited to powers of two), the resulting time domain symbols $t_1$ through $t_{10}$ are periodic in 16 samples.

An embodiment of the invention directed to 802.11a, or the OFDM modes of draft standard 802.11g, employs a multi-tone algorithm to calculate the optimum weights for a subset of IEEE 802.11 tones (subcarriers) that are initially based on known training tones in the long training symbols $T_1$ and $T_2$. In this embodiment, the number of subcarriers N is 64. Each of the long training symbols consists of 53 known subcarriers as shown in the expression:

$L_{-26,26}$={1, 1, −1, −1, 1, 1, −1, 1, −1, 1, 1, 1, 1, 1, 1,
−1, −1, 1, 1, −1, 1, −1, 1, 1, 1, 1, 0, 1, −1, −1, 1,
1, −1, 1, −1, 1, −1, −1, −1, −1, −1, 1, 1, −1, −1, 1,
−1, 1, −1, 1, 1, 1, 1}

Figure 9:
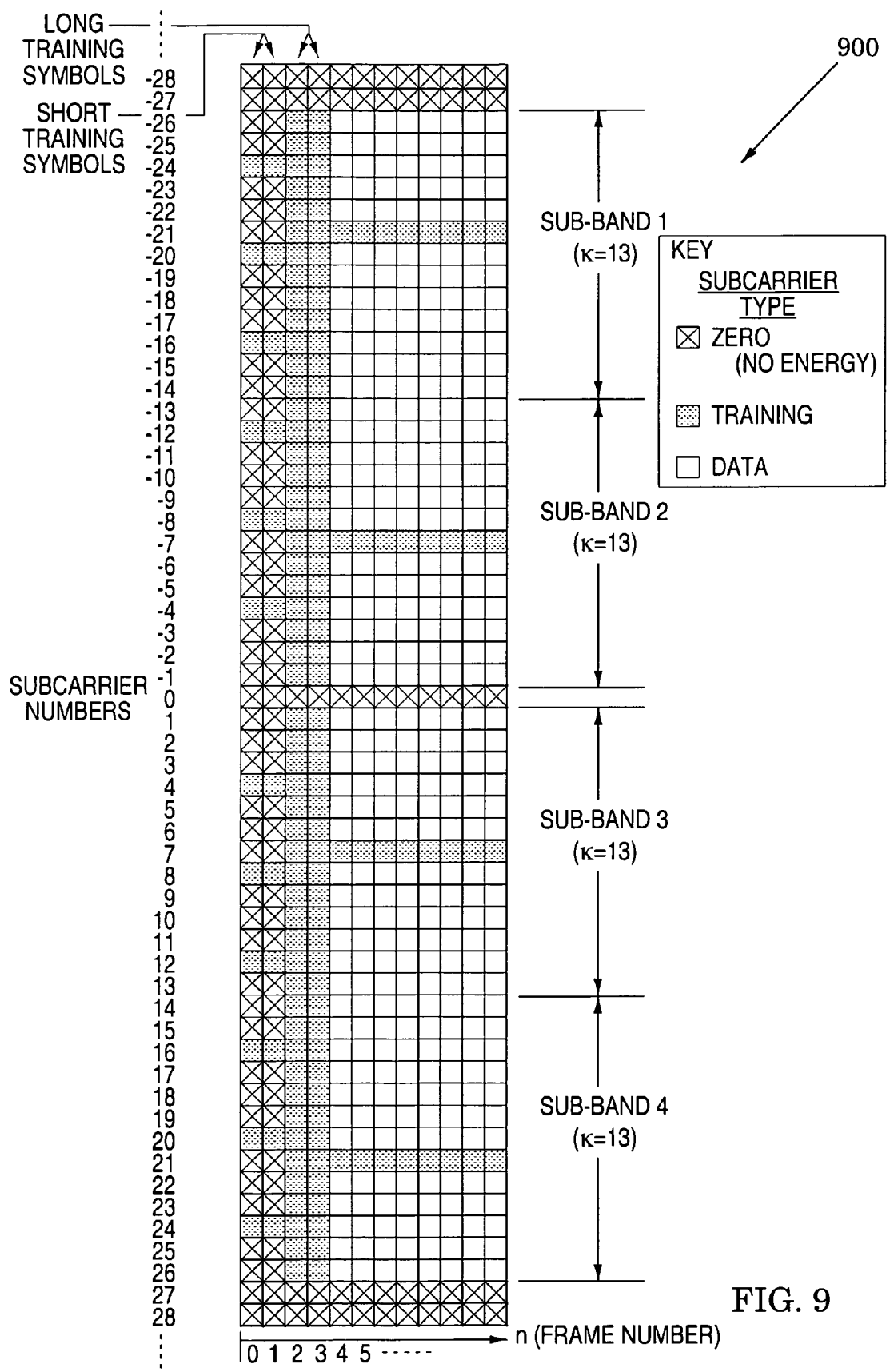

As defined above, $L_0$ is the dc bin of the DFT. The graph 900 of FIG. 9 illustrates time-domain frames 0 and 1 which contain the training subcarriers given in the expression $S_{-26, 26}$ wherein the subcarriers are organized in four sub-bands. Following frames 0 and 1, frames 2 and 3 contain the training subcarriers given in the expression $L_{-26,26}$ wherein. Subsequent frames carry data over most subcarriers with pilot tones in subcarriers −21, −7, 7 and 21. After initial weight calculation, the weights may be updated with methods that process the embedded pilot tones or utilize decisions from the decision-feedback of receive demodulating and decoding 227 of FIG. 2. To allow for subsequent adaptation with the pilot tones, the initial four M×1 weights are calculated for sub-bands as follows (sb designates a sub-band of FIG. 9):

$W_{sb1}$ initially calculated from $L_{-26}$ to $L_{-14}$ ($\kappa$=13) in long symbols $T_1$ and $T_2$ $W_{sb2}$ initially calculated from $L_{-13}$ to $L_{-1}$ ($\kappa$=13) in long symbols $T_1$ and $T_2$ $W_{sb3}$ initially calculated from $L_1$ to $L_{13}$ ($\kappa$=13) in long symbols $T_1$ and $T_2$ $W_{sb4}$ initially calculated from $L_{14}$ to $L_{26}$ ($\kappa$=13) in long symbols $T_1$ and $T_2$ In a pilot tracking mode, the four weights may be adapted using a suitable single-tone method for subsequent OFDM frames that follow the long training symbol $T_2$. The weights are based on embedded pilot tones as follows $W_{sb1}$ adapted from Pilot Subcarrier −21
$W_{sb2}$ adapted from Pilot Subcarrier −7
$W_{sb3}$ adapted from Pilot Subcarrier 7
$W_{sb4}$ adapted from Pilot Subcarrier 21

In a multi-tone, decision-directed tracking mode, the four weights may be adapted using a suitable multi-tone algorithm for subsequent OFDM frames that follow the long training symbol $T_2$. The weights are based on feedback of past decisions as follows (in which 227 refers to the receive demodulating and decoding 227 of FIG. 2)

Figure 10:
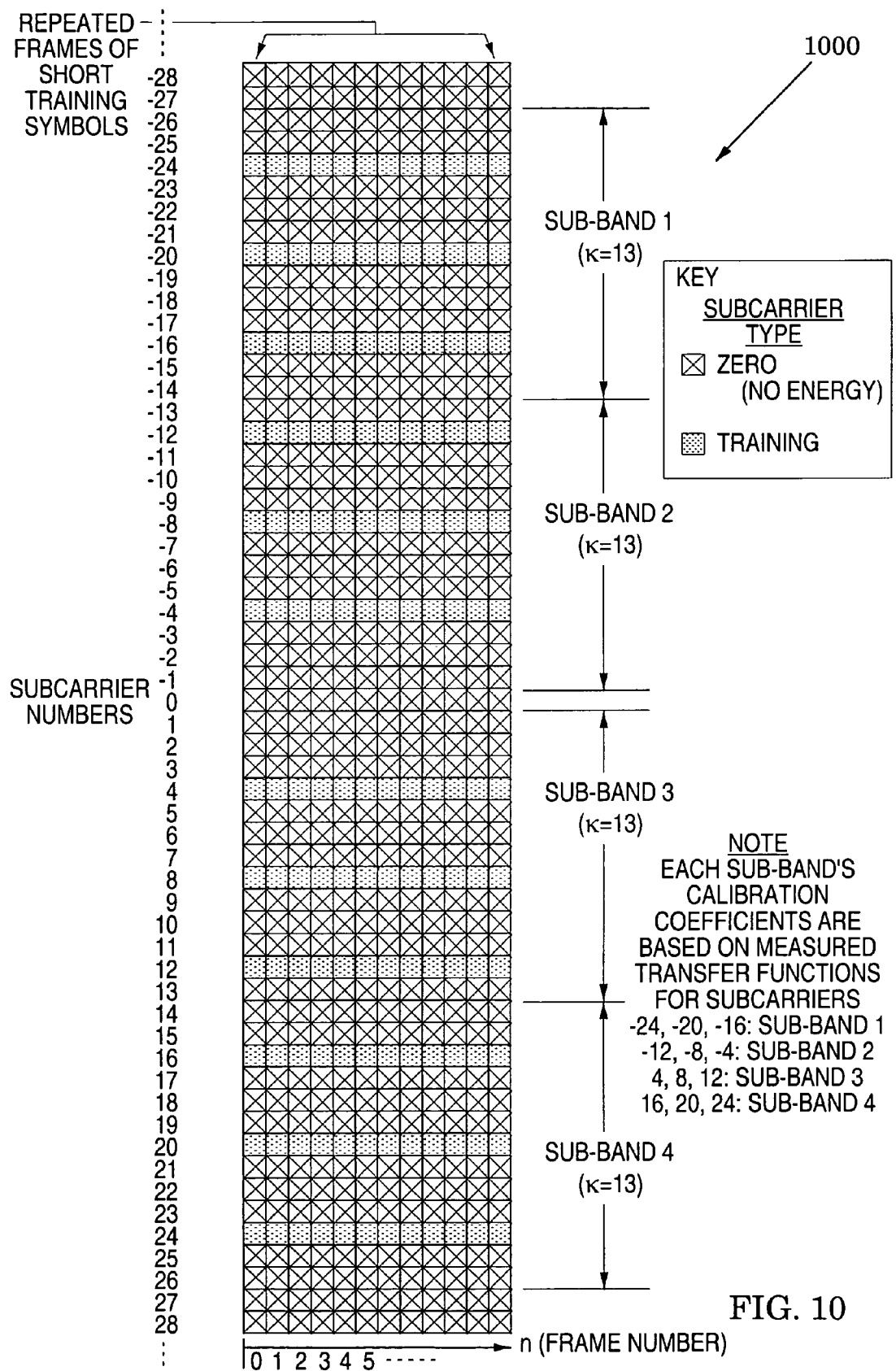
FIG. 10 illustrates frequency-domain locations for calibration subcarriers.

$W_{sb1}$ adapted from data subcarrier −26 to data subcarrier −14 receive demodulation and decoding 227 outputs $W_{sb2}$ adapted from data subcarrier −13 to data subcarrier −1 receive demodulation and decoding 227 outputs $W_{sb3}$ adapted from data subcarrier −1 to data subcarrier 13 receive demodulation and decoding 227 outputs $W_{sb4}$ adapted from data subcarrier 14 to data subcarrier 26 receive demodulation and decoding 227 outputs The graph 1000 of FIG. 10 illustrates, in the frequency domain, an embodiment of the invention for a calibration signal applicable to an IEEE 802.11a (or derivatives thereof, such as 802.11g) system. As shown for successive frames, the calibration signal is generated by repeated transmission of short training symbols which each comprise 12 modulated subcarriers in the frequency domain (five of the symbols are typically contained in each time-domain frame of FIG. 8).

As noted in FIG. 10, coefficients may be determined for each sub-band by measuring the differential gain and phase of the short preamble tones that fall within its allocated bandwidth (e.g., subcarriers 24, 20 and 16 in sub-band 4). The gain and phase measured for individual tones within a sub-band may be averaged to determine the coefficients for the sub-band. Interpolation using tones from adjacent sub-bands is another technique that may be employed to reduce overall error.

In features of the present invention, the conduction network of FIG. 6 and its associated switch structures:

a) compensates for the relative gain and phase errors between spatial channels;

b) provides a feedback mechanism for calibration of separate spatial channels with minimal hardware requirement and takes advantage of multi-channel symmetry to permit passive interconnects on a single plane;

c) provides low insertion loss during normal operation and high isolation to the antennas during calibration;

d) prevents potentially corrupting signals in the environment from effecting calibration without sacrificing high insertion loss in normal operation;

e) reduces costs by utilizing existing RF elements; and f) facilitates the use of frequency-domain processing to provide calibration points across the entire bandwidth of the transmit and receive signals.

More particularly, it is noted that the invention:

a) requires no additional receivers or transmitters for calibration (i.e., utilizes existing receiver and transmitter hardware);

b) requires only minimal increase of digital hardware—the primary addition is the calibration signal source 501 of FIG. 5 which can be simply implemented (e.g., with a hardware lookup table);

c) derives a multiplicity of calibration coefficients that correct for relative gain and phase errors across frequency;

d) derives the calibration coefficients by assigning one spatial channel in transmit and receive as a reference and obtaining the transfer functions of all other spatial channels relative to the reference to thereby avoid the need for hardware typically required for derivation of absolute transfer functions;

e) isolates transceiver antenna elements from calibration signals that circulate during the calibration process to thereby meet emissions requirements mandated by the FCC and other regulatory bodies;

f) obtains calibration coefficients during periods of network inactivity (via, for example, high-speed, low-cost switches) so that transceivers need not go off-line or into a calibration mode that requires user interaction or monitoring;

g) calculates transmit and receive transfer functions and the subsequent calibration coefficients by using background or spare processing cycles if required;

h) combines derived transmit calibration coefficients and predetermined "omni" spatial weights to synthesize an omnidirectional antenna pattern that can be used to transmit, for example, broadcast messages to remote communications devices;

i) derives calibration coefficients with a passive conduction network that can be realized with low-cost structures (e.g., a well-controlled printed circuit board trace and associated switches which may be replaced, in some applications, with passive couplers (i.e., SW1, SW2 blocks in FIG. 6 may be couplers));

j) provides test points for fast, accurate determination (e.g., during product manufacture) of conduction network characteristics (S parameters);

k) simultaneously collects all data for calibration of both main and diversity antenna paths (differences between main/diversity paths may be compensated in hardware (e.g., CMP blocks in FIG. 6) or with compensation factors (determined, for example, by measuring signals at the test points during product manufacture) applied to the calculated calibration coefficients;

l) calculates and applies both transmit and receive calibration coefficients or transmit calibration coefficients only with a factor included in the latter case for adjusting the transmit calibration coefficient for receive characteristics that may be embedded in the receive transfer function;

m) provides the training sequence for 802.11a/g wireless LAN applications with minor modification to existing transmit digital processing functions and produces, with its frequency-domain tone structure, a time-domain signal that does not necessitate receiver synchronization; and n) employs frequency-domain interpolation to reduce overall method error and/or to reduce data collection time.

Lab measurement of the calibration methods of the invention for one embodiment of an M=4, β=2 system have shown that 11.8 dB of transmit combining (12 dB is theoretical) and up to 30 dB of transmit nulling can be achieved.

Although RF elements of the wireless transceiver units of the invention (e.g., RF transceivers 621-624, antennas 613-220 and conduction network 670 of FIG. 6) are generally realized with discrete or integrated circuits, an embodiment of baseband elements (e.g., transmit spatial processing 400 and receive spatial processing 500 of FIGS. 4 and 5) is a signal processor and an embodiment of calibration elements (e.g., calibration method 204 and calibration signal source 501) is a calibration controller, wherein the signal processor and the calibration controller may be realized with discrete elements, arrays of logic gates, appropriately-programmed digital processors and combinations thereof.

Although the teachings of the invention were illustrated with reference to specific sub-bands in FIGS. 9 and 10, the invention may be practiced with various other sub-band selections.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method of calibrating and operating a wireless communications device, comprising the steps of;

directing calibration signals through selected transceivers of said device via respective conduction paths of a conduction network; and determining calibration coefficients from received versions of said calibration signals;

wherein said directing step includes the steps of:

directing calibration signals from a reference one of said transceivers to each of the other transceivers;

directing calibration signals from each of the other transceivers to said reference transceiver;

directing at least one calibration signal between a pair of the other transceivers; and deriving said calibration coefficients from received versions of said calibration signals.

2. The method of claim 1, further including the step of initiating frequency-domain components of said calibration signals within said device.

3. The method of claim 1, further including: selectively coupling anyone of said transceivers to a respective one of a plurality of antennas to facilitate communication of data signals; and selectively coupling anyone of said transceivers to said conduction network to facilitate calibration.

4. The method of claim 1, further including the step of configuring said conduction paths as transmission-line segments.

5. The method of claim 1, further including the steps of:

characterizing said conduction network with conduction parameters; and altering said received versions of said calibration signals with said conduction parameters to determine said calibration coefficients.

6. The method of claim 5, further wherein said conduction parameters are scattering parameters.

7. The method of claim 1, further including the steps of:
characterizing said conduction network with conduction parameters;
altering said received versions of said calibration signals with said conduction parameters to obtain relative transfer functions of said transceivers; and
deriving said calibration coefficients from said relative transfer functions.

8. The method of claim 1, wherein said directing calibration signals through selected transceivers step includes the steps of:
selectively coupling anyone of said transceivers to a respective one of a plurality of main antennas and diversity antennas to facilitate communication of data signals; and
selectively coupling anyone of said transceivers to said conduction network to facilitate calibration.

9. The method of claim 8, further including the steps of:
transforming data signals from said antennas and said transceivers to recover training signals;
spatially weighting frequency-domain components of said data signals in accordance with differences between said training signals and predetermined signal parameters; and
correcting frequency-domain components of said data signals with said calibration coefficients.

10. The method of claim 8, further including the steps of:
applying spatial weights to frequency-domain components of baseband data signals;
correcting frequency-domain components of said baseband data signals with said calibration coefficients; and
transforming said baseband data signals to radiate them from said antennas via said transceivers.

11. The method of claim 1, wherein said selected transceivers are selected pairs of transceivers.

12. A self-calibrating wireless communications device, comprising; a plurality of transceivers; a conduction network configured with conduction paths coupled to said transceivers; and a calibration controller that directs calibration signals through selected ones of said transceivers via said conduction paths to determine calibration coefficients from received versions of said calibration signals: wherein said conduction network is characterized by predetermined conduction parameters and: said controller is configured to alter said received versions of said calibration signals with said conduction parameters to obtain relative transfer functions of said transceivers; and said controller is further configured to determine said calibration coefficients from said relative transfer function.

13. The device of claim 12, further including a calibration signal source that initiates frequency-domain components of said calibration signals.

14. The device of claim 12, wherein said controller is configured to initiate frequency-domain components of said calibration signals.

15. The device of claim 12, further including:
a plurality of antennas; and
a switch network that, in response to said controller, selectively couples anyone of said transceivers to a respective one of said antennas to facilitate communication of data signals; and selectively couples anyone of said transceivers to said conduction network to facilitate calibration.

16. The device of claim 15, wherein said conduction paths are transmission-line segments.

17. The device of claim 15, wherein said conduction paths are continuous conduction paths.

18. The device of claim 15, wherein said conduction paths are microstrip paths.

19. The device of claim 15, wherein said conduction network further includes a plurality of signal splitters/combiners that couple said switch network to said conduction paths.

20. The device of claim 19, wherein said conduction network further includes a plurality of signal attenuators inserted between said switch network and said conduction paths.

21. The device of claim 12, wherein said conduction network is characterized by predetermined conduction parameters and said controller is configured to alter said received versions of said calibration signals with said conduction parameters in determination of said calibration coefficients.

22. The device of claim 21, wherein said conduction parameters are scattering parameters.

23. The device of claim 12, further including:
a plurality of main antennas;
a plurality of diversity antennas; and
a switch network that, in response to said controller, selectively couples anyone of said transceivers to a respective one of said main and diversity antennas to facilitate communication of data signals and selectively couples anyone of said transceivers to said conduction network to facilitate calibration.

24. The device of claim 12, wherein said selected transceivers are selected pairs of transceivers.

25. The device of claim 12, wherein said calibration controller comprises at least one of an array of gates and a digital processor.

26. A self-calibrating wireless communications device, comprising;
a plurality of transceivers;
a conduction network; and
a calibration controller that directs calibration signals through selected ones of said transceivers via respective conduction paths of said conduction network to determine calibration coefficients from received versions of said calibration signals;
and further including:
a plurality of antennas each associated with one of said transceivers; and
a baseband processor configured to:
transform data signals from said antennas and said transceivers to recover training signals;
spatially weight frequency-domain components of said data signals in accordance with differences between said training signals and predetermined signal parameters; and
correct frequency-domain components of said data signals with said calibration coefficients.

27. The device of claim 26, wherein said calibration controller is configured to:
direct calibration signals from a reference one of said transceivers to each of the other transceivers;
direct calibration signals from each of the other transceivers to said reference transceiver;
direct at least one calibration signal between a pair of the other transceivers; and
derive said calibration coefficients from received versions of said calibration signals.

28. The device of claim 26, wherein said baseband processor comprises at least one of an array of gates and a digital processor.

29. A self-calibrating wireless communications device, comprising:
  a plurality of transceivers;
  a conduction network; and
  a calibration controller that directs calibration signals through selected ones of said transceivers via respective conduction paths of said conduction network to determine calibration coefficients from received versions of said calibration signals;
  and further including:
  a plurality of antennas each associated with one of said transceivers; and
  a baseband processor configured to:
    apply spatial weights to frequency-domain components of baseband data signals; correct frequency-domain components of said baseband data signals with said calibration coefficients; and
    transform said baseband data signals to radiate them from said antennas via said transceivers.

30. A wireless communications system, comprising: a plurality of communications devices that exchange data signals wherein at least one of said devices includes:
  a plurality of transceivers; a conduction network configured with conduction paths coupled to said transceivers; and a calibration controller that directs calibration signals through selected ones of said transceivers via said conduction paths to determine calibration coefficients from received versions of said calibration signals; wherein said conduction network is characterized by predetermined conduction parameters and: said controller is configured to alter said received versions of said calibration signals with said conduction parameters to obtain relative transfer functions of said transceivers; and said controller is further configured to determine said calibration coefficients from said relative transfer functions.

31. The system of claim 30, wherein said conduction network further includes a plurality of signal splitters/combiners that couple said switch network to said conduction paths.

32. The system of claim 30, wherein said conduction network further includes a plurality of signal attenuators inserted between said switch network and said conduction paths.

33. A wireless communications system, comprising:
  a plurality of communications devices that exchange data signals wherein at least one of said devices includes:
  a plurality of transceivers;
  a conduction network; and
  a calibration controller that directs calibration signals through selected ones of said transceivers via respective conduction paths of said conduction network to determine calibration coefficients from received versions of said calibration signals;
  and further including:
  a plurality of antennas each associated with one of said transceivers; and
  a baseband processor configured to:
    transform data signals from said antennas and said transceivers to recover training signals;
    spatially weight frequency-domain components of said data signals in accordance with differences between said training signals and predetermined signal parameters; and
    correct frequency-domain components of said data signals with said calibration coefficients.

34. A wireless communications system, comprising:
  a plurality of communications devices that exchange data signals wherein at least one of said devices includes:
  a plurality of transceivers;
  a conduction network; and
  a calibration controller that directs calibration signals through selected ones of said transceivers via respective conduction paths of said conduction network to determine calibration coefficients from received versions of said calibration signals;
  and further including:
  a plurality of antennas each associated with one of said transceivers; and
  a baseband processor configured to:
    apply spatial weights to frequency-domain components of baseband data signals;
    correct frequency-domain components of said baseband data signals with said calibration coefficients; and
    transform said baseband data signals to radiate them from said antennas via said transceivers.

* * * * *